(12) United States Patent
Jia et al.

(10) Patent No.: US 8,170,155 B2
(45) Date of Patent: May 1, 2012

(54) METHOD AND APPARATUS FOR CHANNEL QUALITY MEASUREMENTS

(75) Inventors: Ming Jia, Ottawa (CA); Jianglei Ma, Kanata (CA); Peiying Zhu, Kanata (CA); Dong-Sheng Yu, Ottawa (CA); Wen Tong, Ottawa (CA)

(73) Assignee: Rockstar Bidco, LP, New York, NY (US)

( * ) Notice: Subject to any disclaimer, the term of this patent is extended or adjusted under 35 U.S.C. 154(b) by 0 days.

(21) Appl. No.: 12/839,836

(22) Filed: Jul. 20, 2010

(65) Prior Publication Data

US 2010/0284480 A1    Nov. 11, 2010

Related U.S. Application Data

(63) Continuation of application No. 10/038,916, filed on Jan. 8, 2002, now Pat. No. 7,773,699.

(60) Provisional application No. 60/329,511, filed on Oct. 17, 2001, provisional application No. 60/329,515, filed on Oct. 17, 2001.

(51) Int. Cl.
*H03D 1/00* (2006.01)
*H04L 27/06* (2006.01)

(52) U.S. Cl. ......... 375/341; 375/262; 375/265; 375/358

(58) Field of Classification Search ................. 375/341, 375/265, 303, 340
See application file for complete search history.

(56) References Cited

U.S. PATENT DOCUMENTS 5,995,551 A   11/1999   McCallister et al.
6,175,590 B1   1/2001   Stein
(Continued)

FOREIGN PATENT DOCUMENTS

EP   1081906 A2   3/2001
(Continued)

OTHER PUBLICATIONS

V. Mignone et al. "CD3-OFDM: A New Channel Estimation Method to Improve the Spectrum Efficiency in Digital Terrestrial Television Systems", International Broadcasting Convention, Sep. 14-18, 1995; XP 000617513; pp. 122-128.

*Primary Examiner* — Khanh C Tran
*Assistant Examiner* — Qutbuddin Ghulamali
(74) *Attorney, Agent, or Firm* — Christopher & Weisberg, P.A.

(57) ABSTRACT

A method and apparatus are provided for measuring channel quality over which has been transmitted a sequence of symbols produced by encoding and constellation mapping a source data element sequence. The method includes receiving a sequence of received symbols over the channel whose quality is to be measured. The sequence of received symbols is de-mapped based on a first channel quality indicator previously transmitted to a transmitter of the sequence of symbols. The method also includes decoding the de-mapped symbols to produce a decoded output sequence. In some embodiments, the decoding may be based on the first channel quality indicator. The method also includes re-encoding the decoded output sequence to produce a re-encoded output sequence. The method also includes correlating the de-mapped symbols with the re-encoded output sequence to produce a second channel quality indicator. The second channel quality indicator is transmitted to the transmitter to adaptively select a type of mapping based on the second channel quality indicator. In some embodiments, the transmitter may adaptively select a type of encoding based on the second channel quality indicator.

18 Claims, 12 Drawing Sheets

U.S. PATENT DOCUMENTS

| | | |
|---|---|---|
| 6,188,717 B1 | 2/2001 | Kaiser et al. |
| 6,215,813 B1 * | 4/2001 | Jones et al. ................... 375/146 |
| 6,215,827 B1 | 4/2001 | Balachandran et al. |
| 6,538,986 B2 | 3/2003 | Isaksson et al. |
| 6,553,063 B1 | 4/2003 | Lin et al. |
| 6,611,513 B1 * | 8/2003 | ten Brink ...................... 370/342 |
| 6,621,851 B1 | 9/2003 | Agee et al. |
| 6,633,601 B1 * | 10/2003 | Yang .............................. 375/142 |
| 6,650,694 B1 | 11/2003 | Brown et al. |
| 6,662,337 B1 * | 12/2003 | Brink ............................. 714/792 |
| 6,680,902 B1 | 1/2004 | Hudson |
| 6,690,712 B2 | 2/2004 | Kim et al. |
| 6,721,299 B1 | 4/2004 | Song |
| 6,763,244 B2 * | 7/2004 | Chen et al. .................... 455/522 |
| 6,865,232 B1 | 3/2005 | Isaksson et al. |
| 7,085,314 B2 | 8/2006 | Zhu et al. |
| 2002/0051498 A1 * | 5/2002 | Thomas et al. ............... 375/262 |
| 2002/0183020 A1 | 12/2002 | Zhu et al. |
| 2003/0036359 A1 * | 2/2003 | Dent et al. ...................... 455/63 |
| 2005/0265503 A1 | 12/2005 | Rofheart et al. |
| 2006/0094460 A1 | 5/2006 | Tiedemann, Jr. et al. |
| 2006/0105761 A1 | 5/2006 | Walton et al. |

FOREIGN PATENT DOCUMENTS

| | | |
|---|---|---|
| FR | 2742613 A1 | 6/1997 |
| WO | 9530289 A2 | 11/1995 |
| WO | 9908425 A1 | 2/1999 |
| WO | 0033504 A1 | 6/2000 |
| WO | 0126318 A2 | 4/2001 |
| WO | 02075955 A1 | 9/2002 |

* cited by examiner

METHOD AND APPARATUS FOR CHANNEL QUALITY MEASUREMENTS

RELATED APPLICATIONS

This application is a Continuation of patent application Ser. No. 10/038,916, filed Jan. 8, 2002, entitled METHOD AND APPARATUS FOR CHANNEL QUALITY MEASUREMENTS, which claims priority to U.S. Provisional Application Ser. Nos.: 60/329,511 and 60/329,515, both filed on Oct. 17, 2001, the entirety of all of which are incorporated herein by reference.

FIELD OF THE INVENTION

The invention relates to wireless data transmission, and more particularly to channel quality measurement in respect of such data transmission.

BACKGROUND OF THE INVENTION

Adaptive modulation and coding is a key enabling concept and technology for high-speed wireless data transmission. A wireless channel is typically a random fading channel. Adaptive coding and modulation is a commonly employed solution for transmitting data over such an unknown channel. Conventional design methodology provides a large fade margin in the transmit signal power to combat deep fades which may occur. Such fade margins are typically at least 6 dB, which represents a 200-300% throughput loss. The aim of adaptive coding and modulation is to fully utilize the channel capacity and to minimize the need to use such a fade margin by dynamically selecting the best coding and modulation configuration on-the-fly. This requires the transmitter to have accurate information about the instantaneous channel quality. Such instantaneous channel quality information is extracted at the receiver and fed back to the transmitter. The conventional approach is to measure the channel (signal) to interference power ratio (CIR) at the receiver front-end. Based on the instantaneous CIR and a targeted performance, the transmitter determines and applies the appropriate coding rate and modulation. In general, due to a complex propagation environment, a fast and accurate measurement of the CIR is a very difficult task.

Conventional channel quality measurements can be classified into two categories: (1) pilot based channel quality measurements and (2) decision feedback based channel quality measurements. These methods use the correlation of known sequences, typically Pseudo-Noise (PN) codes, with both the desired signal and the interference. For a slowly varying channel with a sufficient measurement time, the conventional methods can provide an accurate CIR measurement.

Referring to FIG. 1, a conventional pilot based CIR estimation scheme will now be described. In the context of MIMO-OFDM (Multiple Input Multiple Output-Orthogonal Frequency Division Multiplexing), the conventional channel quality measurement uses a pilot header containing two identical known OFDM symbols upon which to base an indication of the current channel quality. FIG. 1 shows a first, second and third base transceiver station (BTS) 100, 110, and 120 transmitting their respective signals, and a mobile station 130 receiving these signals. Mobile station 130 is configured to receive, demodulate and decode a signal transmitted by the second base transceiver station 110. The signals transmitted by the first base transceiver station 100 and the third base transceiver station 120 are received as interference by the mobile station 130. A channel associated with the signal having received signal power C transmitted by base transceiver station 2 ($BTS_2$) 110 is the channel whose quality is to be measured. Suppose that we have N PN codes, and that the length of each PN code is N chips, we then have:

$$PN_i \cdot PN_j = 0 \quad i \neq j$$

$$PN_i \cdot PN_i = N \quad 1 \leq i \leq N.$$

This important relation that the PN codes form a near orthogonal set allows for the extraction of specific channels using the Pilot channel PN codes. In FIG. 1 only three BTSs are shown, and hence there are only three PN codes. The second BTS 110 encodes a signal whose associated channel quality is to be measured, at ENCODER-2 112. The encoded signal is modulated using a PN Code which here is labeled Pilot-$PN_2$ 114 before eventually being transmitted through an antenna 118 to the mobile station 130. The first BTS 100 encodes a signal, which appears as a first interference signal to the mobile station 130, at ENCODER-1 102. This encoded signal is modulated using a PN Code Pilot-$PN_1$ 104 before eventually being transmitted through an antenna 108. The third BTS 120 encodes a signal, which appears as a second interference signal to the mobile station 130, at ENCODER-3 122. This encoded signal is modulated using a PN Code which here is labeled Pilot-$PN_3$ 124 before eventually being transmitted through an antenna 128. All three signals transmitted by antennas 108, 118, and 128 are received by the mobile station 130 at the receiver front-end 134 through antenna 132. The received signal is then passed to a decoder 138 for extraction of the channel to be recovered. The received signal is also passed on to a first correlator 140, a second correlator 142, and a third correlator 144. The correlators of FIG. 1, perform sub-operations corresponding to multiplication, summation, and absolute-value-squared, effectively performing an operation corresponding to taking an inner product of two inputs. The first correlator 140 performs a correlation between the received signal and the PN code Pilot-$PN_1$, which was used to modulate the signal appearing to the mobile as the first interference signal, and outputs an interference power $I_1$. The second correlator 142 performs a correlation between the signal and the PN code Pilot-$PN_2$, which was used to modulate the signal whose quality is to be measured, and outputs a signal power C. The third correlator 144 performs a correlation between the received signal and the PN code Pilot-$PN_3$, which was used to modulate the signal appearing to the mobile as the second interference signal, and outputs an interference power $I_2$. A calculating operation 150 computes the CIR which in this case is simply $C/(I_1+I_2)$.

In general, this approach can be applied to M base transceiver stations. Let $BTS_i$ ($1 \leq i \leq M$) be the M adjacent base transceiver stations, $E_i$ be the corresponding energy from the $i^{th}$ base station that is measured at the mobile station 130, let S be the combined total signal energy received by the mobile at receiver front-end 134, and let $BTS_2$ be the base transceiver station whose associated CIR is to be measured, then $$C = \max_{1 \leq i \leq M} (S \cdot PN_i) = E_2 \cdot N,$$

and $$I = \sum_{i \neq 2} (S \cdot PN_i) = N \cdot \sum_{i \neq 2} E_i.$$

In these equations C and I are energies although for the purposes of determining the ratio C/I, either energy or power may be used. Since the pilot header is composed of two identical OFDM symbols, the CIR calculation process can be based on the average over the two symbols, thus reducing noise. These methods, however, fail to work if the channel is a multi-path fading channel and/or mobility speed is high. One solution is to insert more pilots to improve the measurement quality, however, this introduces overhead which significantly reduces spectral efficiency. For example, in 2G and 3G wireless systems, the pilot overhead is about 20-35%, and the pilot design for these systems is not suitable for fast channel quality measurement. This is the case because fundamentally the accuracy of the channel quality measurement is limited by the Cramer-Rao lower bound, which implies that the accuracy of channel measurement can be gained only at the expense of more pilot overhead (either in time or in power).

As an example of this trade-off, in a proposed MIMO-OFDM system, a pilot header is transmitted every OFDM frame in 10 ms (15 slots). To facilitate adaptive modulation in the mobility case, a CIR estimation must be fed back to the BTS every 2 ms (3 slots). Therefore, CIR measurement based on a pilot header can not provide accurate instantaneous channel quality information. If the actual CIR does not change significantly during that 10 ms, then by measuring the energy of the pilots, one may roughly track the CIR. However, by doing so, the accuracy may diminish towards the end of the slot, as the assumption that the interference is a constant becomes more and more inaccurate.

The above discussed channel quality measurement is for adaptive coding and modulation, and does not in any way relate to channel estimation.

Channel quality measurement is a different concept from channel estimation. Channel quality measurement is performed to measure the channel quality so that proper coding and modulation set can be chosen. Channel estimation is performed to estimate the channel response so that coherent detection can be implemented.

In some wireless communication systems that employ Orthogonal Frequency Division Multiplexing (OFDM), a transmitter transmits data symbols to a receiver as OFDM frames in a MIMO (multiple input, multiple output) context. One of the key advantages of MIMO-OFDM systems is its ability to deliver high-speed data over a multi-path fading channel, by using higher QAM size, water pouring and/or adaptive modulation. In the MIMO-OFDM system, there are two major design challenges: (1) To combat high Doppler spread and fast fading due to high speed mobility (2) To provide a common fast signaling channel to realize fast physical and MAC layer adaptation signaling. To solve the mobility problem, a pilot channel is commonly used in OFDM design; such a pilot channel can be optimized by using the scattered (in time and frequency) pilot pattern. The common fast signaling channel design must be sufficiently reliable to allow most of mobiles to detect the signaling, which introduces a significant amount of system and spectral overhead to sustain the signaling throughput. In the conventional OFDM design scattered pilot and fast signaling channel are arranged as separate overhead channels.

The phase and amplitude of the data symbols may be altered during propagation along a channel, due to the impairment of the channel. The channel response may vary with time and frequency. In order to allow the receiver to estimate the channel response, pilot symbols are scattered among the data symbols within the OFDM frame. The receiver compares the values of the received pilot symbols with the known transmitted values of the pilot symbols, estimates the channel response at the frequencies and times of the pilot symbols, and interpolates the estimated channel responses to estimate the channel response at the frequencies and times of the data symbols.

Transmit Parameter Signaling (TPS) symbols are also transmitted with the data symbols. The TPS symbols are transmitted over specified sub-carriers within the OFDM frame, and are used to provide common signaling channels to allow fast physical and media access control layer adaptation signaling.

Both the pilot symbols and the TPS symbols are overhead, in that they do not carry data. In order to improve the data rate of an OFDM communication system, the overhead within the OFDM frames should be minimized. The minimization of overhead is particularly important in Multiple-Input Multiple-Output (MIMO) OFDM systems. In a MIMO OFDM system having M transmitting antennae and N receiving antennae, the signal will propagate over M×N channels and there may be up to M sets of pilot symbols in the overhead. An example of an OFDM frame format with dedicated TPS and pilot channels is shown in FIG. 7 for the single input, single output case. The horizontal axis 704 shows a circle representing the frequency of each of a plurality of OFDM sub-carriers. The vertical axis 706 is time, with each row representing an OFDM symbol. A set of OFDM symbols constitutes an OFDM frame. In this example, the pilot channel is transmitted in a scattered manner, with the pilot symbols being transmitted every third sub-carrier, and for each sub-carrier every sixth frame. Thus, the first sub-carrier 700 has pilot symbols 701 in the first, seventh (and so on) OFDM symbols. The fourth sub-carrier 702 has pilot symbols 705 in the fourth, tenth (and so on) OFDM symbols. In addition, the third, ninth, $15^{th}$, and $21^{st}$ sub-carriers of every OFDM symbol are used to transmit TPS symbols, collectively indicated at 708. The remaining capacity is used for traffic.

SUMMARY OF THE INVENTION

One embodiment of the invention provides a simple accurate and robust channel quality measurement method with broad applications such as UMTS and 3G wireless system evolution. Advantageously a channel quality indicator (CQI) is measured indirectly, simply, and accurately, and is independent of the mobile speed, independent of multi-path channel characteristics, and avoids Walsh Code Coherent Loss. The CQI is a measure of the overall quality of the channel, not just one factor, such as CIR. In addition the method is easy to implement, as it does not require any additional coding, such as PN codes used in CIR measurement.

A method and apparatus are provided for measuring channel quality over which has been transmitted a sequence of symbols produced by encoding and constellation mapping a source data element sequence. The method includes receiving a sequence of received symbols over the channel whose quality is to be measured. The sequence of received symbols is de-mapped based on a first channel quality indicator previously transmitted to a transmitter of the sequence of symbols. The method also includes decoding the de-mapped symbols to produce a decoded output sequence. In some embodiments, the decoding may be based on the first channel quality indicator. The method also includes re-encoding the decoded output sequence to produce a re-encoded output sequence. The method also includes correlating the de-mapped symbols with the re-encoded output sequence to produce a second channel quality indicator. The second channel quality indicator is transmitted to the transmitter to adaptively select a type of mapping based on the second channel quality indicator. In some embodiments, the transmitter may adaptively select a type of encoding based on the second channel quality indicator.

According to one aspect, a channel quality measurement apparatus is provided which is adapted to measure a quality of a channel over which has been transmitted a sequence of symbols produced by encoding and constellation mapping a source data element sequence. The apparatus has a symbol de-mapper, receiving as input a sequence of received symbols over the channel whose quality is to be measured, the symbol de-mapper being adapted to perform symbol de-mapping on the sequence of received symbols to produce a sequence of soft data element decisions, a type of the symbol de-mapping being based on a first channel quality indicator previously transmitted by the apparatus to a transmitter of the sequence of symbols. There is a soft decoder, receiving as input the sequence of soft data element decisions produced by the symbol de-mapper, the soft decoder being adapted to decode the sequence of soft data element decisions to produce a decoded output sequence. An encoder receives as input the decoded output sequence produced by the soft decoder, the encoder being adapted to re-encode the decoded output sequence with an identical code to a code used in encoding the source data element sequence to produce a re-encoded output sequence. A correlator receives as input the sequence of soft data element decisions produced by the de-mapper, and the re-encoded output sequence produced by the encoder, the correlator being adapted to produce a second channel quality indicator output by determining a correlation between the sequence of soft data element decisions and the re-encoded output sequence. The second channel quality indicator is transmitted to a transmitter to apply a type of mapping based on the second channel quality indicator.

In some embodiments, the symbol de-mapper is adapted to perform QPSK symbol de-mapping in response to the first channel quality indicator and is adapted to perform Euclidean distance conditional LLR symbol de-mapping in response to the second channel quality indicator.

In accordance with yet another aspect, the invention provides a method of measuring channel quality of a channel over which has been transmitted a sequence of symbols produced by encoding and constellation mapping a source data element sequence. A sequence of received symbols over the channel whose quality is to be measured is received. The sequence of received symbols is symbol de-mapped to produce a sequence of soft data element decisions. The sequence of soft data element decisions is decoded to produce a decoded output sequence. The decoding is based on a first channel quality indicator previously transmitted to the transmitter of the sequence of symbols. The decoded output sequence are re-encoded to produce a re-encoded output sequence using a code identical to a code used in encoding the source data element sequence. The re-encoded output sequence and the sequence of soft data element are correlated decisions to produce a second channel quality indicator output. The second channel quality indicator is transmitted to the transmitter to adaptively select a type of coding to be applied to a source data element sequence based on the second channel quality indicator.

In some embodiments, the symbol de-mapper is adapted to perform Euclidean distance conditional LLR symbol de-mapping in response to the first channel quality indicator and is adapted to perform QPSK symbol de-mapping in response to the second channel quality indicator.

According to another aspect, a method of measuring OFDM channel quality of an OFDM channel over which has been transmitted a sequence of OFDM symbols, the OFDM symbols containing an encoded and constellation mapped source data element sequence is provided. The method includes receiving a sequence of OFDM symbols over the OFDM channel whose quality is to be measured. The method also includes symbol de-mapping the sequence of received symbols to produce a sequence of soft data element decisions, the symbol de-mapping being based on a first channel quality indicator previously transmitted to a transmitter of the sequence of OFDM symbols. The method also includes decoding the sequence of soft data element decisions to produce a decoded output sequence pertaining to the source data element sequence, the decoding being based on the first channel quality indicator previously transmitted to the transmitter of the sequence of OFDM symbols. The method also includes re-encoding the decoded output sequence to produce a re-encoded output sequence using a code identical to a code used in encoding the source data element sequence. The method also includes correlating the re-encoded output sequence, and the sequence of soft data element decisions to produce a second channel quality indicator output. The second channel quality indicator is transmitted to the transmitter to adaptively select a type of mapping and a type of coding to be applied to a source data element sequence based on the second channel quality indicator.

Another aspect of the invention provides a communication system having a transmitter adapted to transmit a sequence of symbols produced by encoding and constellation mapping a source data element sequence over a channel; and a receiver having a) a symbol de-mapper, receiving as input a sequence of received symbols over the channel, the symbol de-mapper being adapted to perform symbol de-mapping on the sequence of received symbols to produce a sequence of soft data element decisions, a type of the symbol de-mapping being based on a first channel quality indicator previously transmitted by the receiver to the transmitter of the sequence of symbols; b) a soft decoder, receiving as input the sequence of soft data element decisions produced by the symbol de-mapper, the soft decoder being adapted to decode the sequence of soft data element decisions to produce a decoded output sequence; c) an encoder, receiving as input the decoded output sequence produced by the soft decoder, the encoder being adapted to re-encode the decoded output sequence with an identical code to a code used in encoding the source data element sequence to produce a re-encoded output sequence; and d) a correlator receiving as input the sequence of soft data element decisions produced by the de-mapper, and the re-encoded output sequence produced by the encoder, the correlator being adapted to produce a second channel quality indicator output by determining a correlation between the sequence of soft data element decisions and the re-encoded output sequence. The receiver is adapted to feed the second channel quality indicator back to the transmitter, and the transmitter is adapted to apply a type of modulation to the source data element sequence based on the second channel quality indicator.

Still another aspect of the invention provides a method of adaptive modulation and coding which involves transmitting over a channel a sequence of symbols produced by encoding and constellation mapping a source data element sequence, receiving a sequence of received symbols over the channel, symbol de-mapping the sequence of received symbols to produce a sequence of soft data element decisions, decoding the sequence of soft data element decisions to produce a decoded output sequence, re-encoding the decoded output sequence to produce a re-encoded output sequence using a code identical to a code used in encoding the source data element sequence, correlating the re-encoded output sequence, and the sequence of soft data element decisions to produce a channel quality indicator output, transmitting the channel quality indicator, and using the channel quality indicator to determine and apply an appropriate coding rate and modulation to the source data element sequence.

Yet another broad aspect of the invention provides a method of determining a channel quality comprising correlating a soft data element decision sequence with a second data element sequence, the second data element sequence being produced by decoding the soft data element decision sequence to produce a decoded sequence and then re-encoding the decoded sequence.

Another aspect of the invention provides a method which involves applying forward error coding to a signalling message to generate a coded fast signalling message, MPSK mapping the coded signalling message to produce an MPSK mapped coded signalling message, mapping the MPSK mapped coded signalling message onto a plurality of sub-carriers within an OFDM frame comprising a plurality of OFDM symbols, encoding symbols of the MPSK mapped coded signalling message using Differential Space-Time Block Coding (D-STBC) in a time direction to generate encoded symbols, and transmitting the encoded symbols on a plurality of transmit antennas, with the encoded symbols being transmitted at an increased power level relative to other symbols within the OFDM frame as a function of channel conditions.

In some embodiments, the encoded symbols are transmitted in a scattered pattern.

In some embodiments, transmitting the encoded symbols on a plurality of antennas involves: on a selected sub-carrier, each antenna transmitting a respective plurality N of encoded symbols over N consecutive OFDM symbols, where N is the number of antennas used to transmit, for a total of N×N transmitted encoded symbols, the N×N symbols being obtained from D-STBC encoding L symbols of the MPSK mapped coded signalling stream, where L,N determine an STBC code rate.

In some embodiments, the method further involves transmitting a set of pilot sub-carriers in at least one OFDM symbol, and using the pilot sub-carriers as a reference for a first set of D-STBC encoded symbols transmitted during subsequent OFDM symbols.

In some embodiments, transmitting a set of pilot sub-carriers in at least one OFDM frame involves transmitting a plurality of pilots on each antenna on a respective disjoint plurality of sub-carriers.

In some embodiments, each disjoint plurality of sub-carriers comprises a set of sub-carriers each separated by N−1 sub-carriers, where N is the number of antennas.

In some embodiments, pilot sub-carriers are transmitted for a number of consecutive OFDM frames equal to the number of transmit antennas.

An OFDM transmitter adapted to implement any of the above methods is also provided.

Another aspect of the invention provides a receiving method which involves receiving at least one antenna an OFDM signal containing received D-STBC coded MPSK mapped coded signalling message symbols, recovering received signalling message symbols from the OFDM signal(s), re-encoding, MPSK mapping and D-STBC coding the received coded signalling message symbols to produce re-encoded D-STBC coded MPSK mapped coded signalling message symbols, and determining a channel estimate by comparing the received D-STBC coded mapped coded signalling message symbols with the re-encoded D-STBC coded MPSK mapped coded signalling message symbols.

In some embodiments, a channel estimate is determined for each location (in time, frequency) in the OFDM signal containing D-STBC coded MPSK mapped coded signalling message symbols. The method further involves interpolating to get a channel estimate for remaining each location (in time, frequency) in the OFDM signal.

In some embodiments, the method further involves receiving pilot symbols which are not D-STBC encoded which are used as a reference for a first D-STBC block of D-STBC coded MPSK mapped coded signalling message symbols.

An OFDM receiver adapted to implement any of the above methods is also provided.

An article of manufacture comprising a computer-readable storage medium is also provided, the computer-readable storage medium including instructions for implementing any of the above summarized methods.

Another broad aspect of the invention provides a method of generating pilot symbols from an Orthogonal Frequency Division Multiplexing (OFDM) frame received at an OFDM receiver, the OFDM frame containing an encoded fast signalling message in the form of encoded symbols within the OFDM frame. The method involves processing the encoded symbols based in a scattered pilot pattern to recover the encoded fast signalling message, re-encoding the fast signalling message so as to generate pilot symbols in the scattered pattern and recovering a channel response for the encoded symbols using decision feedback.

In some embodiments, the fast signalling message is examined to see if the current transmission contains content for the OFDM receiver. Only if this is true is the channel response computation process continued for the current transmission.

In some embodiments, processing the encoded symbols involves differentially decoding the encoded symbols using Differential Space-Time Block Coding (D-STBC) decoding to recover the encoded fast signalling message, applying Forward Error Correction decoding to the encoded fast signalling message to recover a fast signalling message, analyzing the fast signalling message to determine whether it includes a desired user identification and if the fast signalling message includes the desired user identification, re-encoding the fast signalling message using Forward Error Correction coding to generate the encoded fast signalling message, and re-encoding the encoded fast signalling message using D-STBC.

Another broad aspect of the invention provides a transmitter adapted to combine pilot and transmission parameter signaling on a single overhead channel within an OFDM signal.

In some embodiments, a set of transmission parameter signaling symbols are transmitted on the overhead channel with strong encoding such that at a receiver, they can be decoded accurately, re-encoded, and the re-encoded symbols treated as known pilot symbols which can then be used for channel estimation.

Another aspect provides a transmitter to transmit a data signal and adapted to combine pilot and transmission parameter signaling on a single overhead channel within an OFDM signal, having a set of transmission parameter signaling symbols that are transmitted on the overhead channel with strong encoding such that at a receiver, they can be decoded accurately, re-encoded, and the re-encoded symbols treated as known pilot symbols which can then be used for channel estimation. In another aspect, the strong encoding is based on a channel quality indicator received from the receiver of the transmission parameter signaling symbols.

Another aspect of the invention provides a receiver adapted to process the combined single overhead channel produced by the above summarized transmitter. The receiver is adapted to decode a received signal containing the encoded transmission parameter signaling symbols as modified by a channel, re-encode the decoded symbols to produce known pilot symbols, compare received symbols with the known pilot symbols to produce a channel estimate.

Other aspects and features of the present invention will become apparent to those of ordinary skill in the art upon review of the following description of specific embodiments of the invention in conjunction with the accompanying figures.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

According to one embodiment of the invention, a measurement of the quality of the received signal is obtained by measuring a value representative of the average distance between the received signal and the reference signal constellation. In general the poorer the channel, the more scattered and random is the received signal on the reference signal constellation, and therefore the larger the average distance between the signal and its closest constellation reference point.

In some implementations, the purpose of channel quality measurement, as was the case for C/I estimation, is for a successful coding rate and modulation assignment. A "successful" assignment here is one which achieves desired performance characteristics. In accordance with this purpose, a new channel quality measurement referred to herein as the "Channel Quality Indicator" (CQI) is provided. The CQI provides an overall assessment of the quality of the channel, including the effects of interference, multi-path fading, and Doppler spread.

In developing the CQI, a soft output from a de-mapping function is used to obtain a measurement of channel quality, since the amplitude of the soft output can be used as an indication of the confidence of the signal. If the channel quality is high, the soft output value will be high, and vice versa. All the channel impairments will be reflected in such an indicator, independent of their source and character. This has been demonstrated by simulation results, which show that such an indicator is invariant to the interference, multi-path fading and Doppler spread.

The preferred embodiment presented is based on an MIMO-OFDM frame structure in which a QAM constellation is employed, and provides an indirect channel quality measurement approach based on soft QAM demodulation and de-mapping. However, more generally, embodiments of the invention provide for any frame structure which employs a method of modulation and mapping having an associated reference symbol constellation which can be used in soft demodulation and de-mapping such as PSK (phase shift keying) and PAM (pulse amplitude modulation) to name a few examples.

Figure 1:
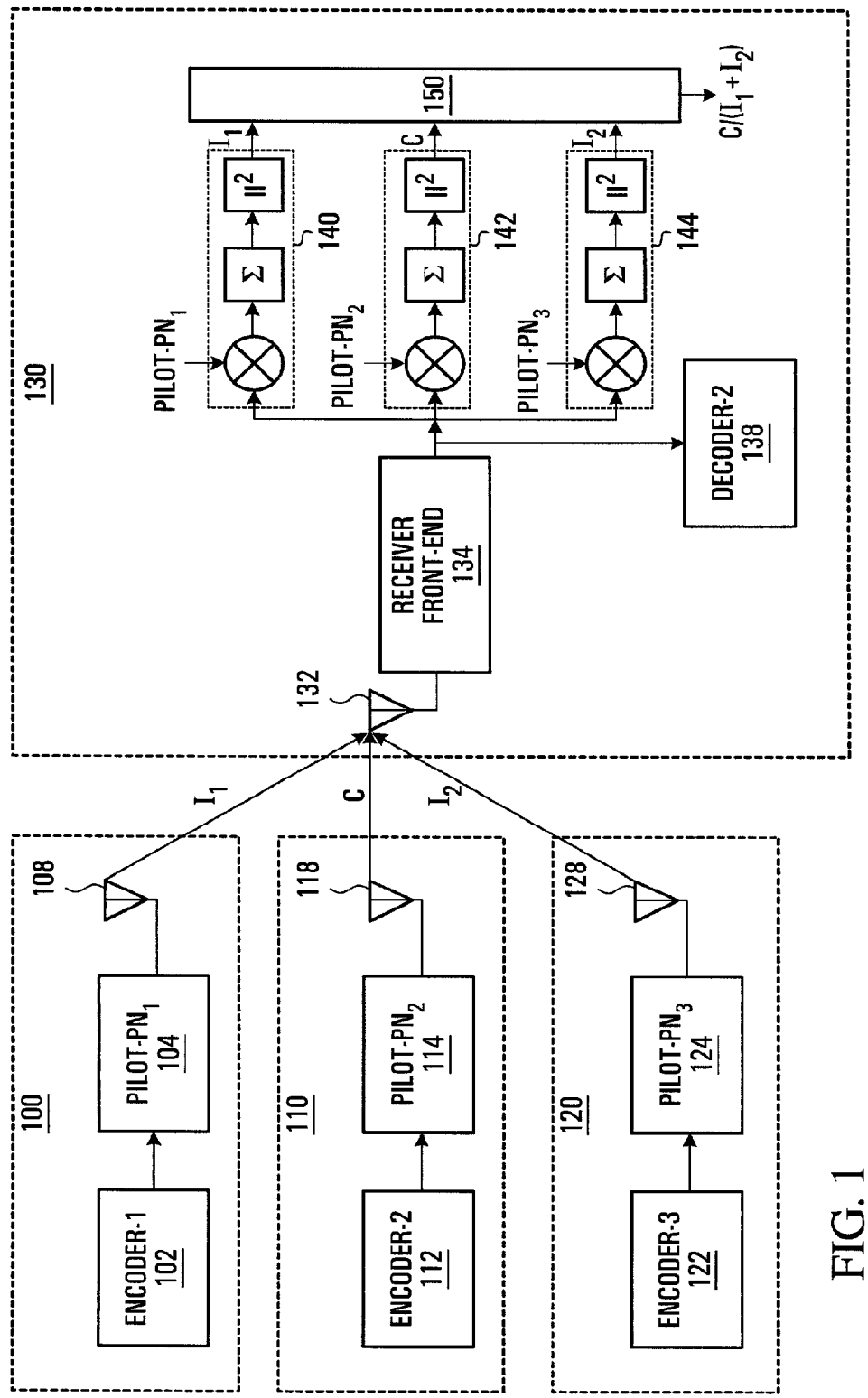
FIG. 1 is a diagram of a standard carrier to interference ratio (CIR) estimator using a known channel quality measurement technique.
Figure 2:
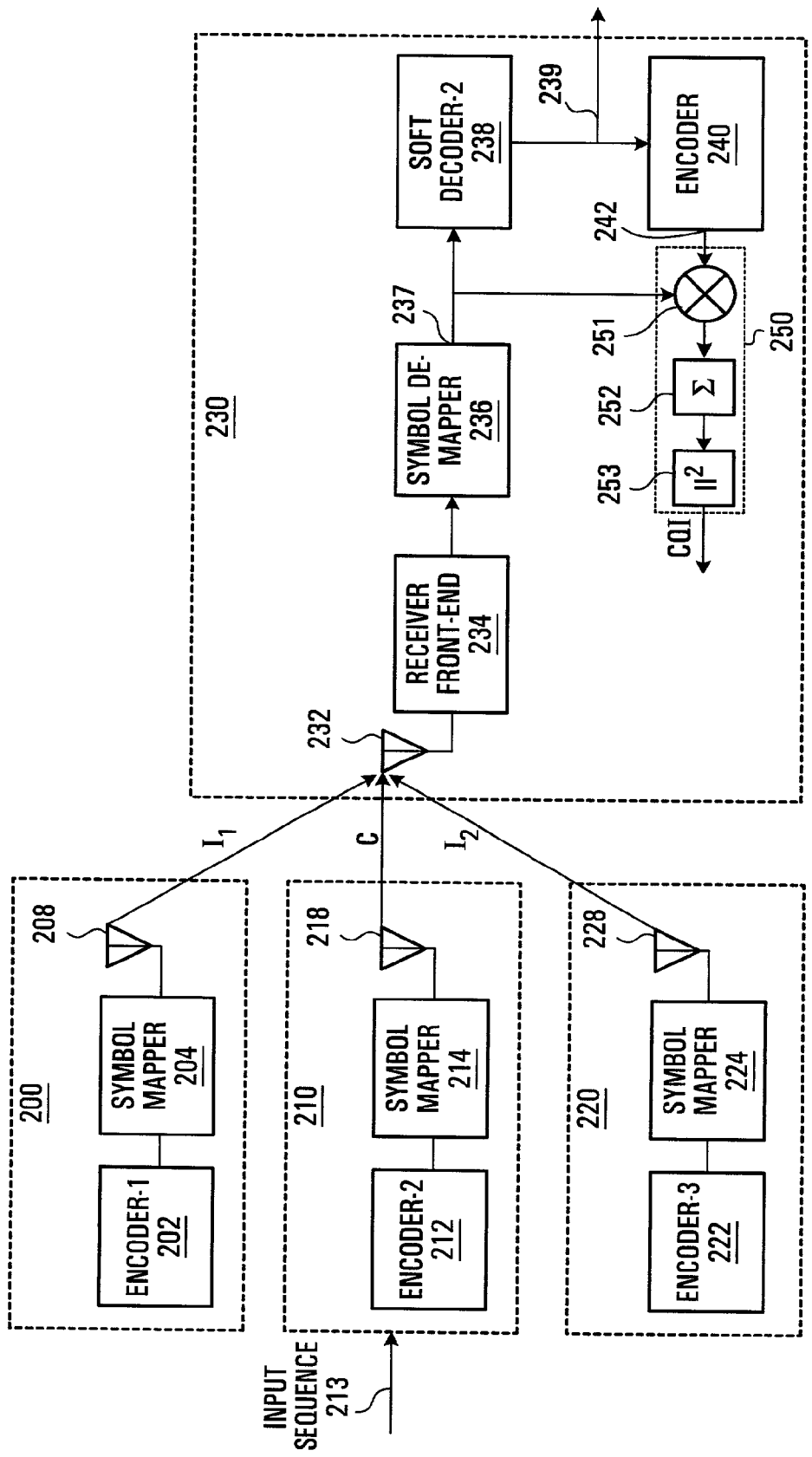
FIG. 2 is a diagram of a channel quality indicator (CQI) estimator constructed according to an embodiment of the invention.

Referring to FIG. 2, a preferred embodiment of the invention will now be described. It is assumed for the purpose of this example that a signal from a second base transceiver station 210 is a desired signal whose associated channel quality is to be measured by a mobile station 230, and that signals from two other (first and third) base stations 200, and 220, can be considered to be noise by mobile station 230. There may be other sources of noise as well, and the channel may introduce distortions such as multi-path fades, residual Doppler shifts, and thermal white noise. The second BTS 210 encodes an input sequence 213 (assumed to be a sequence of bits, but more generally a sequence of data elements) at ENCODER-2 212 to produce an encoded bit sequence. The encoded bit sequence contains redundancy which allows some error detection/correction at the receiver. The encoded bit sequence is then mapped to constellation points with symbol mapper 214. These constellation points are modulated and transmitted as a signal whose associated channel quality is to be measured. The signal is transmitted through an antenna 218 to a mobile station 230. The modulation type (and associated constellation) and type of coding employed by ENCODER-2 212 are both adaptively selected as a function of a channel quality indicator fed back from the mobile station 230.

The first BTS 200 encodes with ENCODER-1 202 and maps with symbol mapper 204 to produce a signal, which appears as a first interference signal to the mobile station 230. This signal is transmitted through an antenna 208. The third BTS 220 encodes with ENCODER-3 222 and maps with symbol mapper 224 to produce a signal which appears as a second interference signal to the mobile station 230. This signal is transmitted through an antenna 228. All three channels transmitted by antennas 208, 218, and 228 are received by the mobile station 230 at the receiver front-end 234 through antenna 232, although in this example, the signal from the second base transceiver station 210 is the desired signal. According to the preferred embodiment, the received signal is then passed to a symbol de-mapper 236. The symbol de-mapper 236 takes raw symbol data from the receiver front end 234 and de-maps the raw symbol data taking into account the known signal constellation used at the transmitting base station 210 to produce a soft bit decision sequence. The de-mapped symbols (soft bit decisions) inherently constitute a representation of confidence, and are used as inputs to a soft decoder 238. The symbol de-mapper 236 outputs a de-mapped output signal at output 237 both to the soft decoder 238 and to a correlator 250. The soft decoder 238 performs soft decoding on the de-mapped output signal and outputs a soft decoded output signal to an encoder 240. The soft decoded output is also output at 239 as a receiver output, this being the best available estimate at the receiver of input sequence 213. Alternatively, a different receiver structure may be used to generate a receiver output. The encoder 240 re-encodes the output of the soft decoder to produce an encoded output signal and outputs this encoded output signal from output 242 to a correlator 250. The same encoding is used as was employed at ENCODER-2 212 of the base station 210. Assuming proper decoding and re-encoding, the output of the encoder 240 is the same as the encoded sequence produced by the encoder 212 at the base transceiver station 210. The correlator 250 correlates the re-encoded sequence from the encoder output 242, with the de-mapped output signal (soft bit decision sequence) from the symbol de-mapper output 237. The correlator 250 outputs this correlation as a channel quality indicator (CQI). The higher this correlation, the closer the de-mapped symbols are on average to the transmitted constellation symbols and as such the higher the channel quality. In the illustrated example, correlator 250 multiplies the re-encoded bit sequence 242 with the soft bit decision sequence with multiplier 251. These are summed with summer 252, and then the square absolute value is taken as indicated at 253. Other methods of correlating may be employed.

Figure 3:
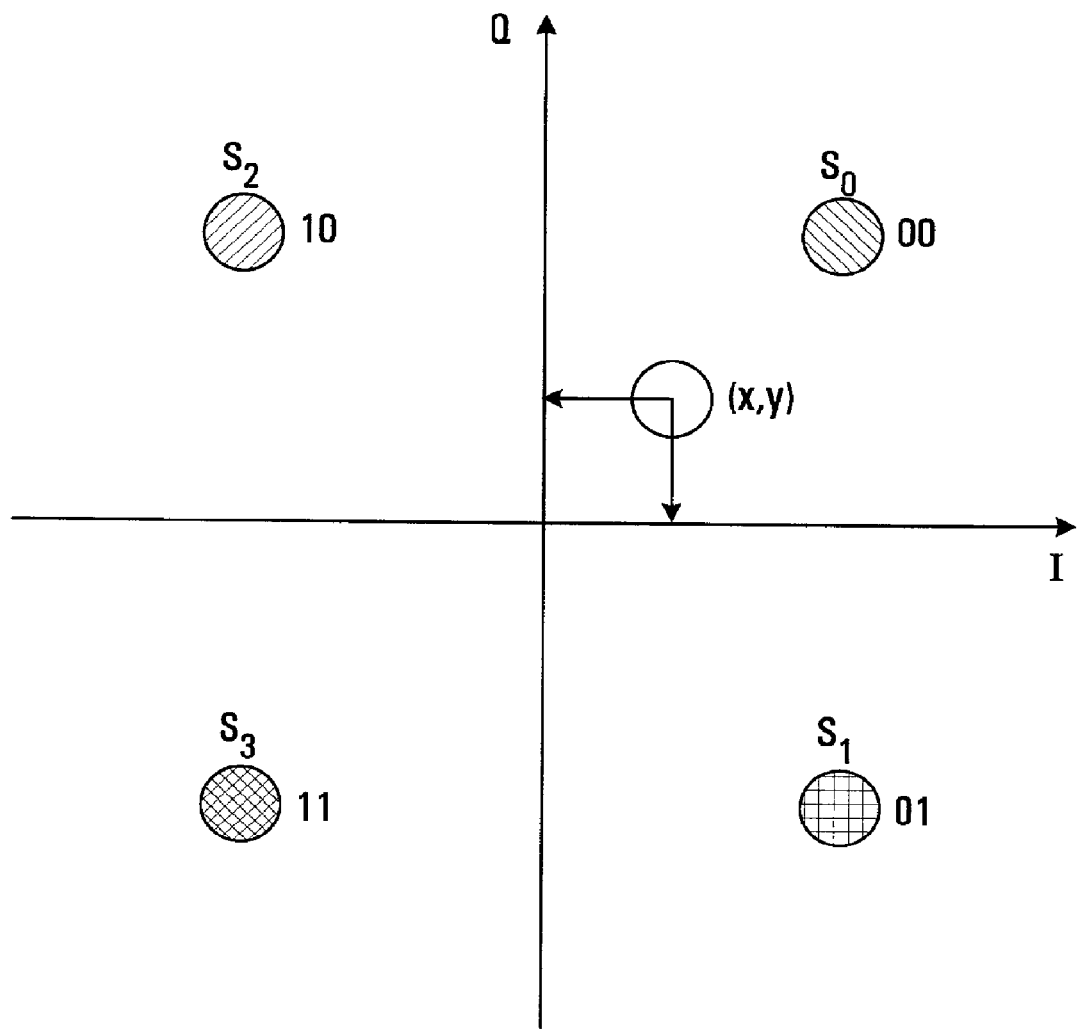
FIG. 3 is a graph showing a QAM constellation to illustrate QPSK de-mapping according to an embodiment of the invention.

In one example implementation, the symbol de-mapper 236, takes the input from the receiver front end 234, and performs de-mapping based on Euclidean distance. The preferred embodiment is described in the context of QPSK de-mapping, which is a special case of PSK de-mapping. Generally for PSK modulation, there are two types of de-mapping methods based on whether or not the PSK signals have been normalized. For coherent de-mapping, since the exact reference constellations are known, the optimum de-mapping is based on Euclidean distance; while for non-coherent de-mapping, which is often the case when differential encoding is used, de-mapping can only be based on angle. The de-mapping-based-on-angle method is a sub-optimum one, as it ignores the information carried in the amplitude of a signal. As a special case of PSK de-mapping, QPSK de-mapping does not depend upon signal normalization. As is the case in de-mapping higher QAM signals, QPSK de-mapping is based on an LLR (logarithm of likelihood ratio) and in this example, as described with reference to FIG. 3, uses Euclidean distance. The constellation depicted in FIG. 3 is a QPSK constellation with Grey mapping. Corresponding to the bit sequences 00, 01, 10 and 11 are constellation points $S_0$, $S_1$, $S_2$, and $S_3$ respectively, whose co-ordinates are $(x_0, y_0)$, $(x_1, y_1)$, $(x_2, y_2)_5$ and $(x_3, y_3)$ respectively. Point $(x, y)$ represents the signal input from the receiver front end 234. The soft de-mapped bits $b_1 b_2$ using Euclidean distance LLR can be expressed as:

$$b_1 = \log \frac{e^{-((x-x_2)^2+(y-y_2)^2)/2\sigma^2} + e^{-((x-x_3)^2+(y-y_3)^2)/2\sigma^2}}{e^{-((x-x_0)^2+(y-y_0)^2)/2\sigma^2} + e^{-((x-x_1)^2+(y-y_1)^2)/2\sigma^2}}$$

$$b_2 = \log \frac{e^{-((x-x_1)^2+(y-y_1)^2)/2\sigma^2} + e^{-((x-x_3)^2+(y-y_3)^2)/2\sigma^2}}{e^{-((x-x_0)^2+(y-y_0)^2)/2\sigma^2} + e^{-((x-x_2)^2+(y-y_2)^2)/2\sigma^2}},$$

where $\sigma^2 = 2EN_o$, and E is the energy of per QPSK symbol. The calculation of bit $b_1$ can be simplified. Since the four QPSK constellation points have equal distance to the origin (0,0):

$$x_0^2 + y_0^2 = x_1^2 + y_1^2 = x_2^2 + y_2^2 = x_3^2 + y_3^2.$$

Then $b_1$ simplifies to:

$$b_1 = \log \frac{e^{-((x-x_2)^2+(y-y_2)^2)/2\sigma^2} + e^{-((x-x_3)^2+(y-y_3)^2)/2\sigma^2}}{e^{-((x-x_0)^2+(y-y_0)^2)/2\sigma^2} + e^{-((x-x_1)^2+(y-y_1)^2)/2\sigma^2}}$$

$$= \log \frac{e^{(xx_2+yy_2)/\sigma^2} + e^{(xx_3+yy_3)/\sigma^2}}{e^{(xx_0+yy_0)/\sigma^2} + e^{(xx_1+yy_1)/\sigma^2}}$$

$$= \log \frac{e^{(xx_3+yy_3)/\sigma^2} + \left(1 + e^{(xx_2+yy_2)-(xx_3-yy_3)/\sigma^2}\right)}{e^{(xx_1+yy_1)/\sigma^2} + \left(1 + e^{(xx_0+yy_0)-(xx_1-yy_1)/\sigma^2}\right)}$$

Since $x_0 = x_1$ and $x_2 = x_3$:

$$b_1 = \log \frac{e^{(xx_3+yy_3)/\sigma^2} + \left(1 + e^{y(y_2-y_3)/\sigma^2}\right)}{e^{(xx_1+yy_1)/\sigma^2} + \left(1 + e^{y(y_0-y_1)/\sigma^2}\right)}$$

Let D be the vertical distance in the I-Q plot between $S_0$ and $S_1$, and between $S_2$ and $S_3$.
Therefore $y_0 - y_1 = y_2 - y_3 = D$, and:

$$b_1 = \log \frac{e^{(xx_3+yy_3)/\sigma^2}}{e^{(xx_1+yy_1)/\sigma^2}}$$

$$= \frac{1}{\sigma^2} \log(e^{x(x_3-x_1)+y(y_3-y_1)})$$

Because of the symmetry of the constellation $x_3 - x_1 = -D$. Since $y_1 = y_3$, $b_1$ can be expressed as:

$$b_1 = -\frac{D}{\sigma^2} x$$

Similarly, $b_2$ is expressed as:

$$b_2 = -\frac{D}{\sigma^2} y$$

If the noise is fixed, then the QPSK de-mapping algorithm can be simplified further to:

$b_1 = -x$ $b_2 = -y$,

This is equivalent to two BPSK signals and is very easy to compute.

In STBC (Space-Time Block Coding), the combined QPSK signal x is normalized by the factor $\delta^2 = |h_{11}|^2 + |h_{21}|^2 + |h_{12}|^2 + |h_{22}|^2$ where $h_{n,m}$ are elements of an MIMO (Multiple Input Multiple Output) channel matrix. Suppose the noise variances of the four channels are the same, i.e., $\sigma^2$, then the noise power becomes $(\sigma/\delta)^2$. Thus $b_1$ with STBC is $$b_1 = -\frac{D}{(\sigma/\delta)^2}\left(\frac{x}{\delta^2}\right)$$

$$= -\frac{D}{\sigma^2} x$$

This verifies therefore that QPSK in STBC de-mapping is not affected by different scaling factors used in normalization. The conditional LLR soft de-mapped bits $b_1 b_2$ are output to the soft decoder 238 which uses the de-mapped bits, and takes into account the data stream history information, the encoding algorithm which was used in Encoder-2 212, to make a best estimate of the original unencoded code word. This best estimate which is output from the soft decoder 238 is re-encoded by encoder 240 using the same encoding algorithm as encoder-2 212. The re-encoded code word is output from encoder output 242, to the correlator 250. The correlator 250 correlates the conditional LLR output from output 237 of the symbol de-mapper 236, with the re-encoded code word output from output 242 of the encoder 240. The act of correlation projects the conditional LLR onto the re-encoded code word, the result of which is an inner product output which is used as the Channel Quality Indicator (CQI).

Figure 4:
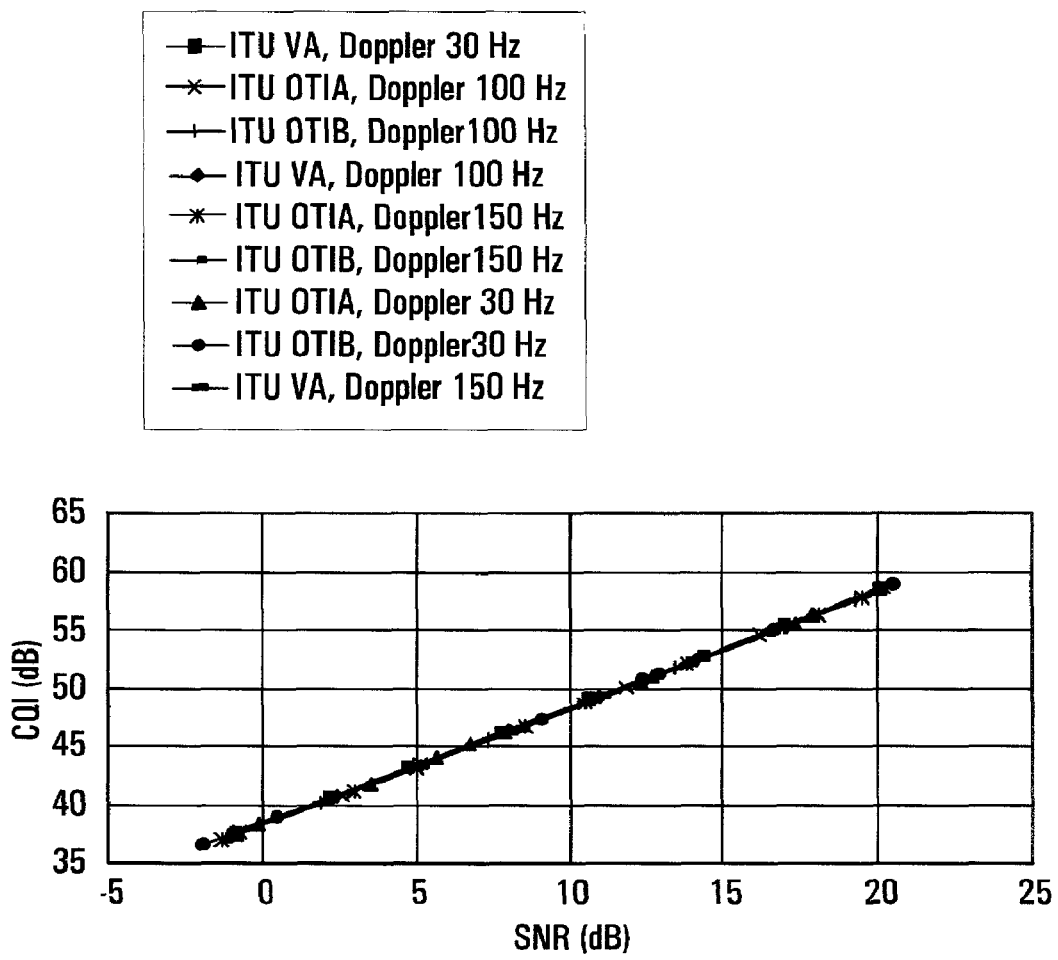
FIG. 4 is a graph showing simulation results of CQI versus SNR for different Doppler frequencies.
Figure 5:
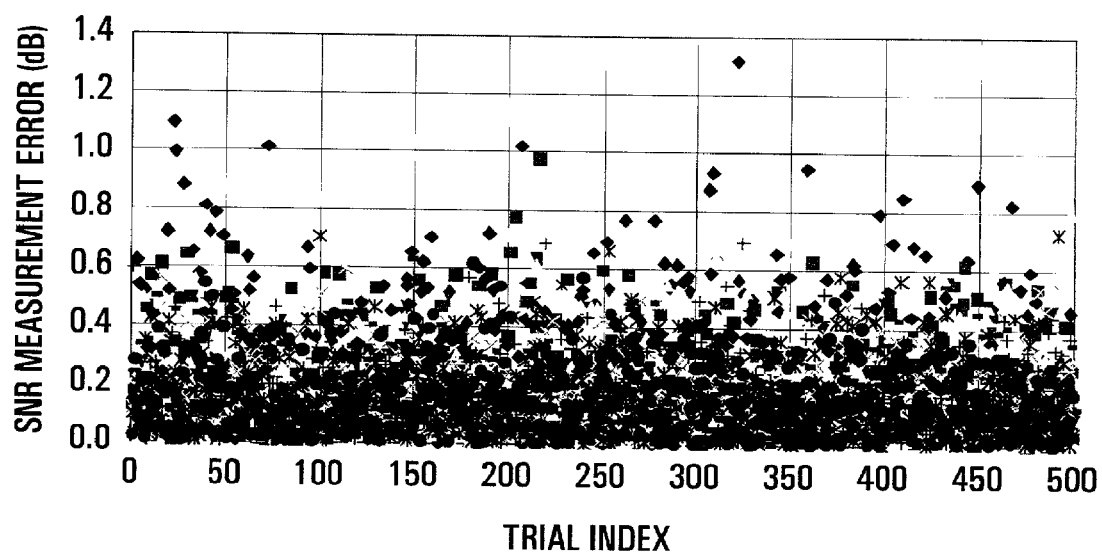
FIG. 5 is graph showing statistical results of CQI measurements.
Figure 6:
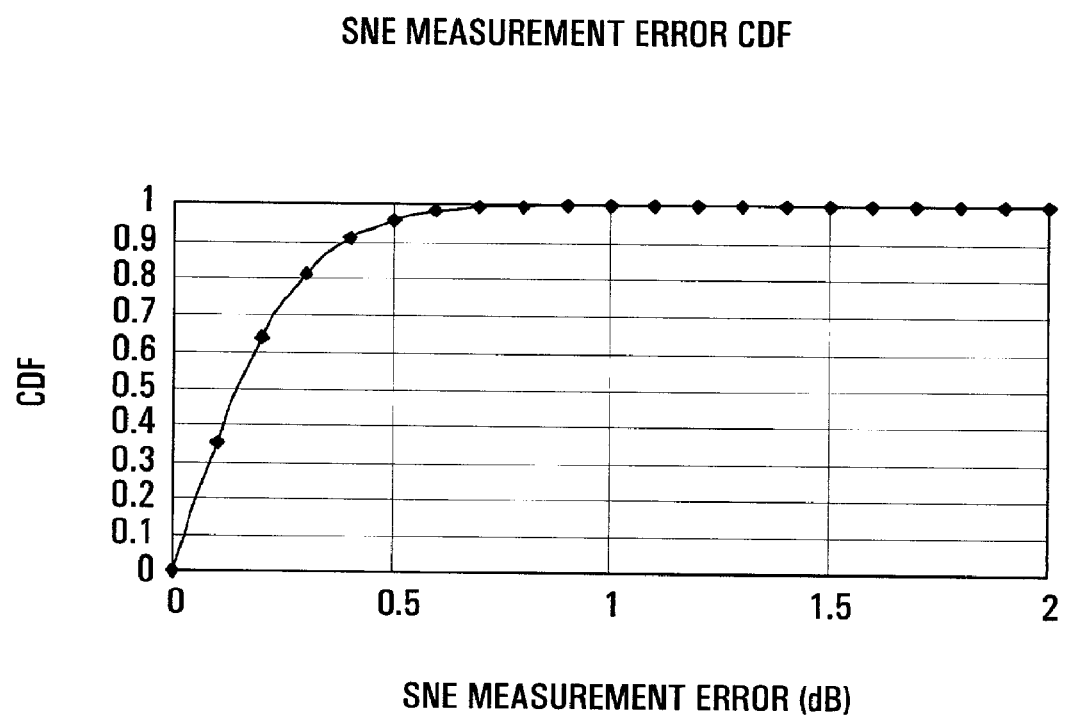
FIG. 6 is a graph showing a CDF of SNR measurement error based on the CQI.
Figure 7:
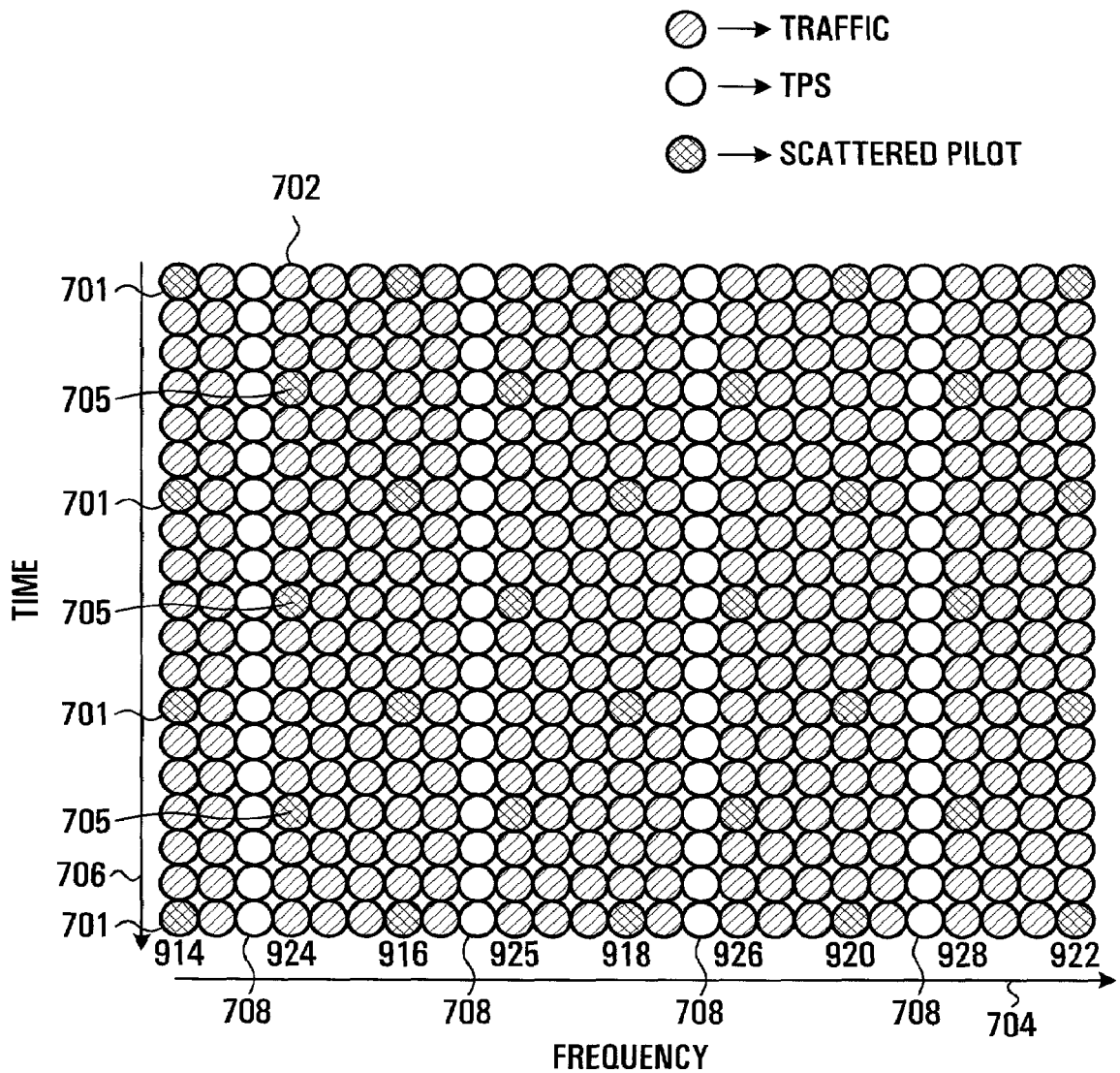
FIG. 7 is a diagram of OFDM symbol allocation for dedicated pilot and TPS channels.

Advantageously the CQI, because it is a measure of the correlation between the symbol de-mapper output and the re-encoded sequence, indicates the channel distortion. The use of the likelihood value relies neither on the code type (block code, convolutional code, or turbo code), nor on the decoding method (hard or soft), and does not distinguish where the interference originates, e.g., neighboring-cell interference, white thermal noise, or residual Doppler shift. The CQI uses all the information available for the estimation, not only the values of the de-mapped output, but the likelihood of being a code word as well, which is much more accurate than measuring soft output value alone, especially when the code rate is low. In FIG. 4, simulation results are shown in a graph of normalized CQI versus SNR for different Doppler frequencies for the Bi-orthogonal code (16,5). In FIG. 5 statistical SNR measurement error results are shown, and in FIG. 6, simulation results are shown in a CDF of SNR measurement error based on the CQI. These graphs show that for a given BER, the CQI is relatively invariant with respect to various Doppler frequencies and different channel models. This means that conversely, irrespective of channel conditions, the CQI can be used to provide a consistent representation of BER, and as such using the CQI to perform adaptive coding and modulation decisions, a desired BER can be achieved. This is accomplished by feeding back the CQI to the transmitter whose signal is associated with the channel whose quality is to be measured. Based on the CQI and the desired performance, the transmitter determines and applies the appropriate coding rate and modulation.

Combined Pilot and TPS Channel

In the above embodiment, coded transmit data is used at a receiver to generate a channel quality indicator for use in making adaptive coding and modulation decisions. In another embodiment of the invention, a method is provided of combining pilot symbols with Transmit Parameter Signalling (TPS) symbols within an Orthogonal Frequency Division Multiplexing (OFDM) frame in such a manner that channel estimation can still be performed. The method may be implemented at a SISO (single-input single-output) transmitter or implemented at a Multiple-Input Multiple-Output (MIMO) OFDM transmitter, and can be described broadly as four steps. First, a fast signalling message is forward error coding (FEC) encoded to generate a coded fast signalling message. Second, the coded fast signalling message is mapped onto symbols within the OFDM frame. Third, the symbols are encoded using Differential Space-Time Block Coding (D-STBC) to generate encoded symbols. The D-STBC coding is preferably applied in the time direction of the OFDM frame, as the channel response of the channel over which scattered pilot sub-carriers are transmitted will usually vary more rapidly with frequency direction than with time direction, and so differential decoding at the OFDM receiver is more likely to yield a better estimate of the channel response if the differential decoding is with respect to symbols distributed along the time direction. Fourth, the encoded symbols are transmitted in a scattered pilot pattern at an increased power level relative to other traffic data symbols within the OFDM frame. In some embodiments, the power level is only increased relative to other traffic data symbols if channel conditions are poor.

The method allows fast signalling messages to be used as pilot symbols, thereby reducing overhead within the OFDM frame.

A method of extracting pilot symbols from an OFDM frame in which the pilot symbols have been combined with TPS symbols, as described above, is also provided. The method is implemented at a MIMO OFDM receiver when an OFDM frame containing encoded symbols is received at the OFDM receiver, and can be described broadly as eight steps. First, the OFDM receiver recovers the encoded symbols based on the scattered pattern to recover the D-STBC blocks. Second, the OFDM receiver differentially decodes the recovered D-STBC blocks using D-STBC decoding to recover the FEC encoded fast signalling message. Third, the OFDM receiver applies FEC decoding to the FEC encoded fast signalling message to recover the fast signalling message. Fourth, the OFDM receiver analyzes the fast signalling message to determine whether it includes a desired user identification. If the fast signalling message includes the desired user identification, then the OFDM receiver knows that the current TPS frame contains data for the user and continues processing the OFDM frame. As a fifth step, the OFDM receiver re-encodes the fast signalling message using FEC coding. Sixth, the OFDM receiver re-encodes the encoded fast signalling message using D-STBC encoding. If the fast signalling message does not include the receiver's user identification, then power can be saved by not proceeding to conduct the rest of the channel estimation steps.

Now the TPS symbols having been D-STBC re-encoded can be used as pilots. A channel response for the D-STBC encoded symbol can be obtained by comparing the known transmitted pilots (re-encoded TPS data) with the received signals. A channel response is obtained for each TPS insertion point. The channel responses thus determined can then be used to interpolate a channel response for every traffic data symbol, at all times and frequencies, within the OFDM frame. Preferably, this is done by performing a 2-dimensional interpolation (in time direction and frequency direction) to generate channel estimate for some points where TPS were not inserted. This is followed by an interpolation in frequency to generate a channel estimate for every sub-carrier of OFDM symbols containing TPS data. In some embodiments, every OFDM symbol contains some TPS insertion points and as such this completes the interpolation process. In other embodiments, there are some OFDM symbols which do not have any TPS insertion points. To get channel estimates for these OFDM symbols, an interpolation in time of the previously computed channel estimates is performed. In high mobility applications, TPS should be included in every OFDM symbol avoiding the need for this last interpolation in time step.

A fast algorithm may be applied at the OFDM receiver when computing a Discrete Fourier Transform based on the scattered pattern in order to extract the combined pilot and fast signalling message. This reduces power consumption at the OFDM receiver.

The invention has been described with respect to a MIMO-OFDM communication system. The invention may also be used in a single transmitter OFDM communication system, but will be of less advantage as the number of pilot symbols transmitted as overhead is more manageable than in MIMO OFDM communication systems.

The method of combining pilot symbols with the TPS channels and the method of extracting pilot symbols are preferably implemented on an OFDM transmitter and on an OFDM receiver respectively in the form of software instructions readable by a digital signal processor. Alternatively, the methods may be implemented as logic circuitry within an integrated circuit. More generally, the methods may be implemented by any computing apparatus containing logic for executing the described functionality. The computing apparatus which implements the methods may be a single processor, more than one processor, or a component of a larger processor. The logic may comprise external instructions stored on a computer-readable medium, or may comprise internal circuitry.

One of the constraints of conventional STBC is the need for accurate knowledge of channel information. In order to eliminate the requirements for channel knowledge and pilot symbol transmission, D-STBC is preferable for high mobility application.

A detailed example will now be provided for the case where a 2-input, 2-output system is being employed, although the technology is applicable to arbitrary numbers of antennas. also, for this example, an OFDM symbol having 25 sub-carriers is assumed, although any number of sub-carriers may be employed. This example is assumed to operate on with frames of 16 OFDM symbols, but more generally any length of frame may be employed.

Figure 8:
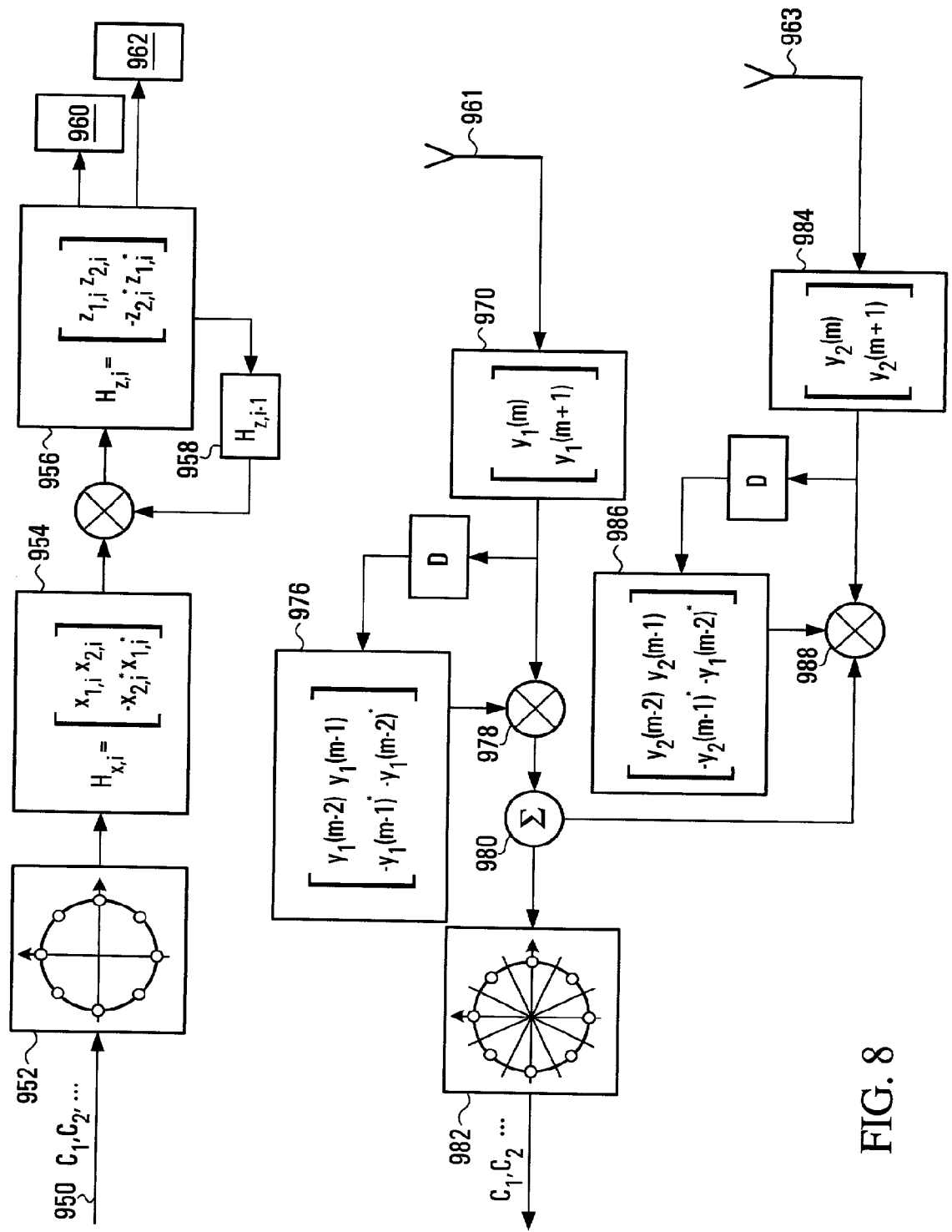
FIG. 8 is a block diagram of an OFDM system employing combined TPS and pilot signaling in a single overhead channel provided by an embodiment of the invention.

A preferred D-STBC scheme is shown in FIG. 8 and described in detail below. To design the D-STBC for MIMO-OFDM, there are 3 major issues to be addressed.

Differential direction, Data protection and Initialization/reset.

Differential Direction

Figure 9:
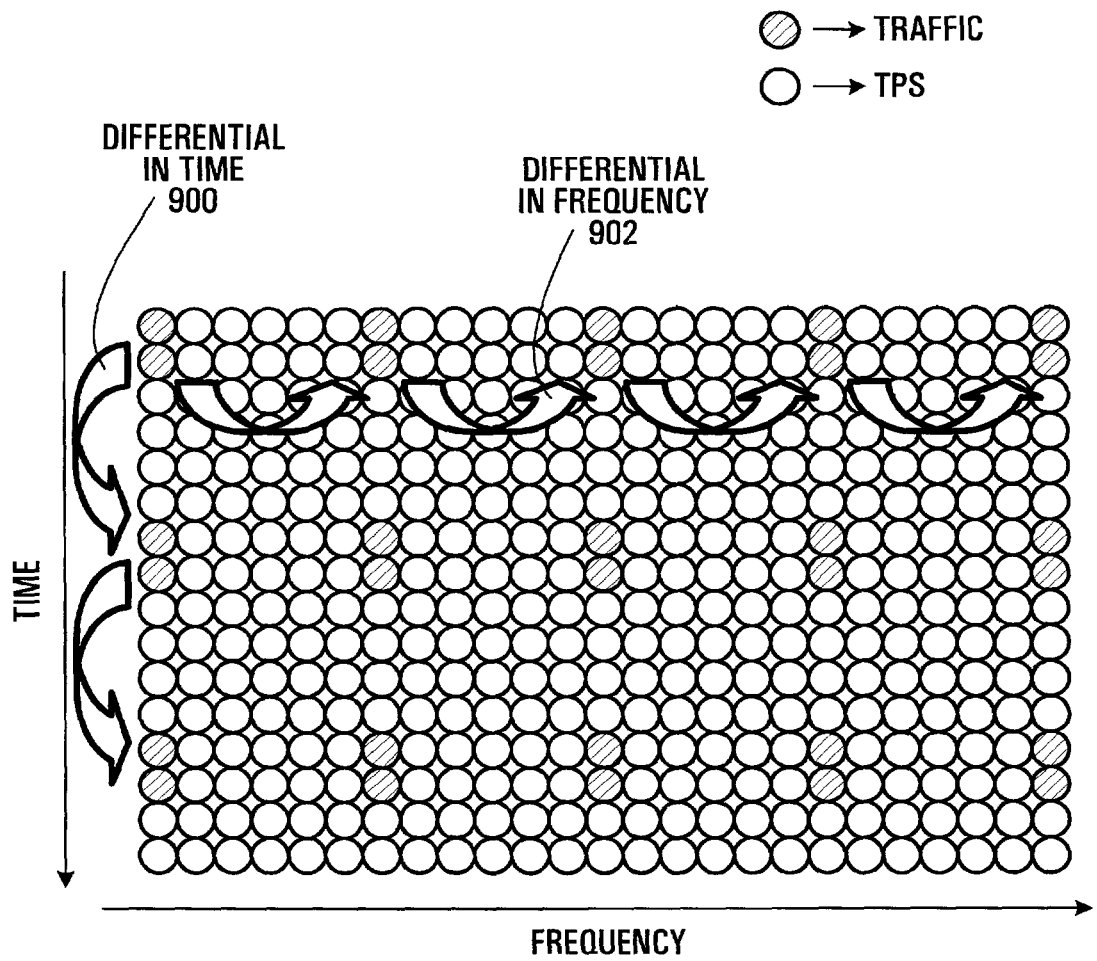
FIG. 9 is an OFDM symbol allocation diagram showing time and frequency differentials.

One of the critical assumptions for any differential encoding is that the channel variation between two coded symbols should be sufficiently small. For the time-frequency structure of the OFDM signal as shown in FIG. 9, the channel variation along the frequency axis represents the multi-path channel induced frequency selectivity, the channel variation along the time axis represents the temporal fading variation. The differential encoding direction should be optimized.

Differential in frequency is limited by the channel coherence bandwidth determined by the multi-path delay spread. The phase shift between two adjacent pilots could be very large, for example, for the ITU Vehicular A channel, if the two pilot blocks are 16 bins apart, then the phase shift of the channel between the two positions can be as high as 7C, which makes differential decoding impossible. To solve this problem, the span of pilots in the frequency domain must be reduced. However, this will further increase the pilot overhead.

Differential in time is limited by Doppler frequency caused by high-speed mobility. For practical channel models, we can assume that the channel remains approximately the same along several OFDM symbols. The channel variation along the time direction varies much slower than along the frequency direction, therefore, D-STBC should preferably be encoded along time direction. According to a preferred embodiment of the invention, due to the STBC structure, a pair of the STBC encoded TPS symbols are allocated on the same frequency index (sub-carrier) of two adjacent OFDM symbols. The two possible differentials are shown in FIG. 9. Differential in time encoding is generally indicated by 900 and differential in frequency encoding is generally indicated by 902.

Data Protection

FEC encoding is preferably applied to TPS data, since the decoding of the TPS data is critical for configuring the receiver to detect the traffic data correctly and for the correct re-encoding of the TPS data so as to allow an accurate decision feedback to reliably convert the TPS into a scattered pilot. A (32, 6) Hadamard code might for example be used. However, the code selection is not limited to this code alone.

Initialization and Reset

Figure 10:
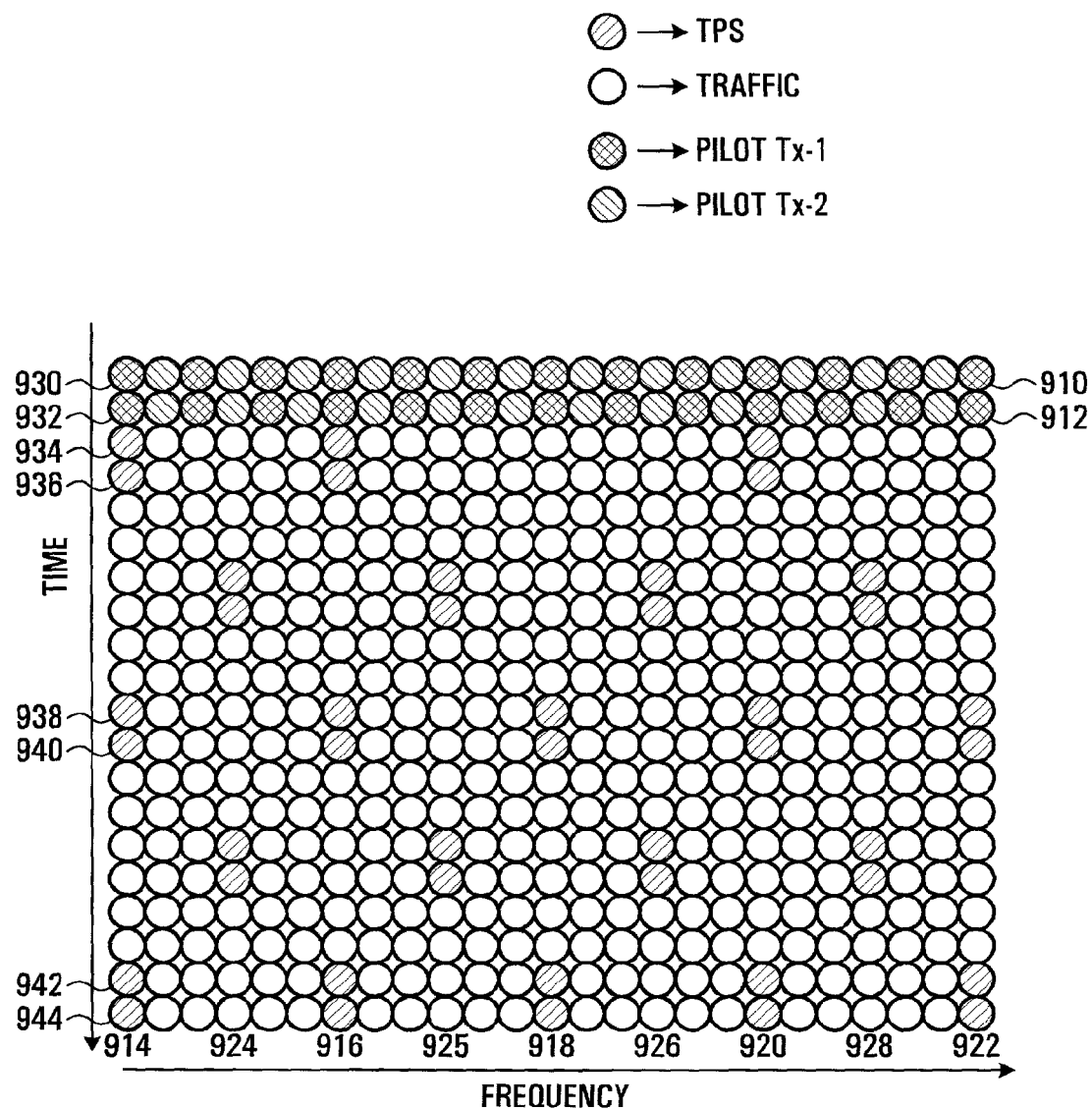
FIG. 10 is an example of an OFDM symbol allocation diagram showing pilot and TPS symbol locations.

D-STBC relies on two consecutively received code blocks to decode the current block of data. Since the OFDM header may not employ D-STBC for the reason of frequency offset and sampling frequency estimation etc., the first received D-STBC block does not have any previous blocks to do the differential processing. This means that the first block of TPS cannot carry any signaling information. To solve this problem, preferably pilot channel OFDM symbols are periodically inserted in the OFDM symbols. An example of this is shown in FIG. 10 where pilot symbols are inserted in every sub-carrier periodically, for example 2 pilot channel OFDM symbols for every 20 OFDM symbols. The pilot symbols transmitted on the pilot channel OFDM symbols are preferably sent only by one antenna at a time for a given frequency. For example, in a two antenna system, the pilot symbols may alternate in frequency between the first and second antenna. This is shown in FIG. 10 where two OFDM symbols 910,912 are used to transmit pilot symbols, and every odd sub-carrier is used for the first antenna, and every even sub-carrier is used for the second antenna. These pilot symbols may then be used as a reference for subsequent D-STBC symbols. For each antenna, interpolation can be performed to obtain pilot information for the intervening non-transmitted sub-carriers. Thus, interpolation is performed for the even sub-carriers for the first transmitter, and interpolation is performed for the odd sub-carriers for the second transmitter.

The channel information obtained from the pilot header is then used to decode the first blocks of TPS. Since the pilot header is transmitted periodically, the D-STBC encoder is also reset at the same frequency. After the first blocks of TPS are processed, the user has also obtained the first blocks of D-STBC references. In addition, the resetting of D-STBC encoder by periodic pilot headers prevents error propagation in the decision-feedback channel estimation process.

FIG. 10 also shows the example locations of TPS symbols and of data symbols. In this example, the first two OFDM symbols 910,912 of every 20 symbol cycle contain pilot symbols as discussed above. The third through 20$^{th}$ frames contain TPS or data. A diamond lattice pattern is used for TPS symbols, with every third sub-carrier containing TPS symbols, alternating between three sets of two TPS symbols on the first, seventh, thirteenth, nineteenth and twenty-fifth sub-carriers 914,916,918,920,922, and two sets of two TPS symbols on the fourth, tenth, sixteenth and twenty-second sub-carriers 924,925,926,928.

Unlike the pilot symbols transmitted in frames 910,912 which are transmitted by one antenna per sub-carrier, for each TPS symbol location shown in FIG. 10 TPS data is transmitted all of the antennas, (i.e. by both antennas in our example). The TPS data transmitted on the two antennas collectively forms a common TPS channel.

Figure 11:
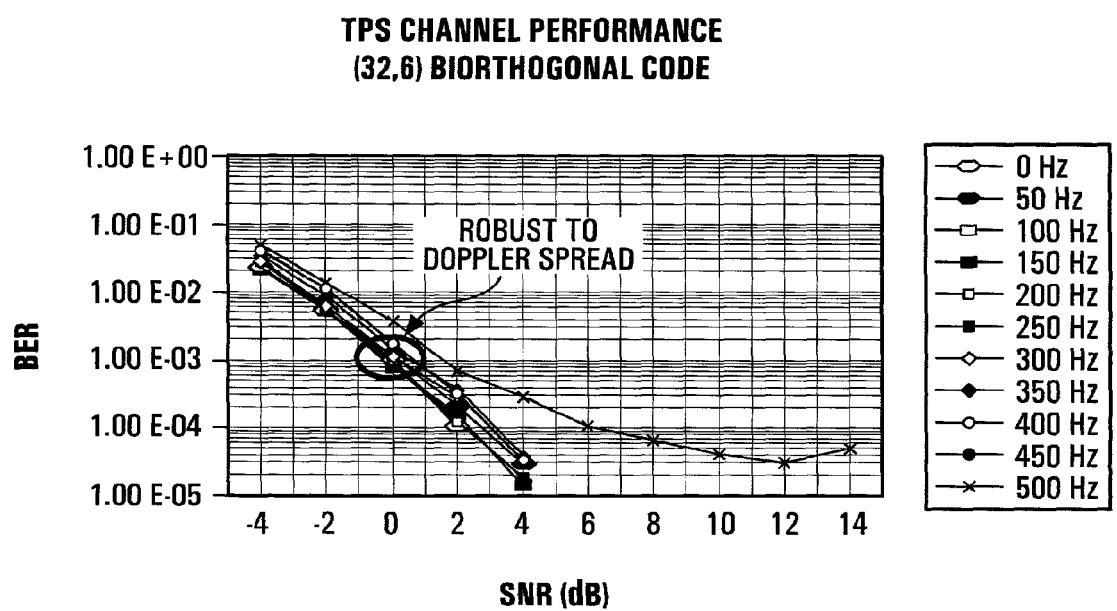
FIGS. 11 and 12 are example performance results for the system of FIG. 8.
Figure 12:
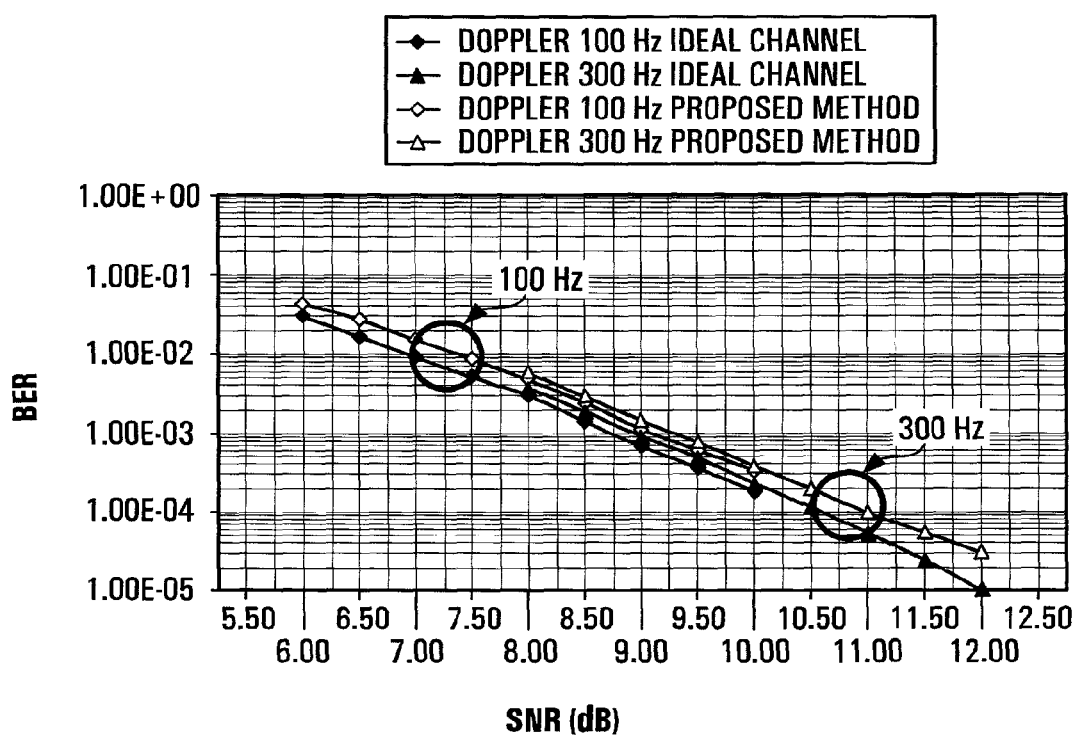

FIG. 11 shows TPS bit error rate versus SNR curves for various Doppler frequencies. As we can see from the figure, it is very robust to Doppler spread. FIG. 12 shows the simulation results for traffic channel based on TPS assisted channel estimation. From this figure, it can be seen that the degradation due to TPS decoding error is negligible.

The details of the preferred D-STBC approach will now be explained. D-STBC involves the recursive computing of a transmission matrix. By "differential," it is meant the current transmitted D-STBC block is the matrix product operation between the previously transmitted D-STBC block and the current STBC block input.

As indicated previously, preferably TPS data is transmitted on two consecutive OFDM symbols for the same sub-carrier for a set of sub-carriers which may change from one set of two OFDM symbols to another set of two OFDM symbols. More generally, for a MIMO system with N antennas, TPS data is transmitted over N consecutive OFDM frames for the same sub-carrier. The transmission matrix is an N×N matrix that determines what to transmit on the N (consecutive OFDM frames)×N (number of antennas) available TPS symbol locations. For the example being described in detail, N=2. The actual amount L of TPS data transmitted depends on the D-STBC code rate. For example, if there are four antennas, then a 4×4 STBC matrix is obtained from encoding three symbols from the MPSK mapped TPS signaling stream.

Referring to FIG. 10, the first sub-carrier transmitted by both antennas will contain TPS data on the third, fourth, ninth, tenth, and $15^{th}$, $16^{th}$ frames. The data will be both time and space differentially encoded meaning that there is information both in the difference between symbols sent at different times (differential time), and in the difference between symbols sent on different antennas (differential space).

The first and second pilot symbols 930 (frame 910) and 932 (frame 912) transmitted by the first antenna on the first sub-carrier and an interpolated value for the first pilot and second pilot symbols transmitted by the second antenna on the first sub-carrier collectively provide a reference for the first two TPS symbols 934,936 transmitted by the two antennas. Subsequent TPS symbols rely on previously transmitted TPS symbols as references.

Referring now to FIG. 8, the forward error corrected TPS data to be transmitted on a given sub-carrier is indicated as a sequence $\{C_1, C_2 \ldots\}$ 950, assumed to be M-ary in nature. This is M-PSK mapped at 952. M-PSK symbols are then processed pairwise (for the 2×2 case) with a pair of M-PSK symbols at time i being referred to as $\{x_{1,i}, x_{2,i}\}$. Space time block coding produces a 2×2 STBC matrix $H_{x,i}$ 954 which contains $x_{1,i}$, $x_{2,i}$ in a first column and $-x_{2,i}^*$, $x_{1,i}^*$ in the second column. For the purpose of the TPS frames, the STBC block index i increments once every 2 OFDM symbols. A counter m will represent OFDM symbols with the $m^{th}$ and $m+1^{th}$ OFDM symbol from transmitter STBC block index i, m=2i. In the Figure, the output of the encoder at time i is identified as $H_{z,i}$, 956 with the output at time i−1 identified as $H_{z,i-1}$ stored in delay element 958. $H_{z,i}$ has the same structure as $H_{x,i}$. The following encoder equation can be obtained for the output as a function of the input:

$$H_{z,i} = \frac{1}{\sqrt{E_x}} H_{x,i} H_{z,i-1}$$

where $H_{z,i}$ is the D-STBC matrix at STBC block index i, $H_{x,i}$ is the STBC input matrix at STBC block index i, and $E_x$ is the energy of each signal in $H_{x,i}$. The output $H_{z,i}$ is a 2×2 matrix having four elements with the first row of the elements being transmitted on one antenna 960, and second row of the elements being transmitted on the other antenna 962. For the example of FIG. 10, the matrix $H_{z,i}$ is transmitted collectively by the two antennas during TPS symbol locations 934,936 of the first sub-carrier using the pilot symbols as the reference.

Referring again to FIG. 8, at a single antenna receiver, the antenna receives a signal $Y_1 = y_1(m), y_1(m+1)$ at STBC block index i over two OFDM frames m, m+1 for each sub-carrier. This will be received on a single sub-carrier over two OFDM frames.

To understand D-STBC is to observe the following key equation which holds true for antenna 1:

$$\begin{bmatrix} y_1(m) \\ y_1(m+1) \end{bmatrix} = H_{z,i} A_{1,i}$$
$$= \frac{1}{\sqrt{E_x}} H_{x,i} H_{z,i-1} A_{1,i} \approx \frac{1}{\sqrt{E_x}} H_{x,i} \begin{bmatrix} y_1(m-2) \\ y_1(m-1) \end{bmatrix}$$

where $y_1(m), y_1(m+1)$ is the received signal over two OFDM frames for STBC block index i, $H_{x,i}$ is the STBC block input at STBC block index i, $E_x$ is the energy of signal elements in $H_{x,i}$, $A_{1,i}$ is the channel matrix for receive antenna 1 representing the channel response $h_{11}$ from first transmit antenna to the receive antenna and $h_{21}$ for the second transmit antenna to the receive antenna at STBC block index i, and $H_{z,i}$ is the transmitted D-STBC block signal at STBC block index i. D-STBC can only be applied to PSK modulation, and therefore, $E_x$ is a fixed value. Also, $H_{z,i}$ takes the same format as $H_{x,i}$, i.e., $$H_{z,i} = \begin{bmatrix} z_{1,i} & z_{2,i} \\ -z_{2,i}^* & z_{1,i}^* \end{bmatrix}.$$

From the equation $$\begin{bmatrix} y_1(m) \\ y_1(m+1) \end{bmatrix} \approx \frac{1}{\sqrt{E_x}} H_{x,i} \begin{bmatrix} y_1(m-2) \\ y_1(m-1) \end{bmatrix}$$

we can obtain $H_{x,i}$ from the four consecutively received signals $y_1(m-2), y_1(m-1), y_1(m), y_1(m+1)$. Note that in the case of multiple receiver antennas, the same expression holds true for each antenna. Since D-STBC works on STBC blocks, it also has the same soft failure property as STBC, i.e., the system will not break down due to transmitting antennas failure—as long is still at least one antenna working. In addition, the code design for MIMO channel is in fact a task for STBC, and is irrelevant to D-STBC. Therefore, D-STBC can be easily expanded to the case with transmitter diversity of order more than 2.

Other System Design Considerations

Encoding

Although theoretically the differential encoding is after STBC encoding, (i.e. STBC matrix Hx,i is computed and then Hz,i is computed), in practice, these steps can be reversed in order. The main advantage of reversing the order is that the STBC encoding process can be unified, which makes it very simple and easy to implement. To elaborate, we can calculate $z_{1,i}$ and $z_{2,i}$ from $x_{1,i}$ and $x_{2,i}$ first, then puncture or insert $z_{1,i}$ and $z_{2,i}$ into the data stream that are to be STBC encoded. The elements $z_{1,i}$ and $z_{2,i}$ can be calculated as follows:

$$z_{1,i} = \frac{1}{\sqrt{E}} (x_{1,i} z_{1,i-1} - x_{2,i} z_{2,i-1}^*)$$

$$z_{2,i} = \frac{1}{\sqrt{E}} (x_{1,i} z_{2,i-1} + x_{2,i} z_{1,i-1}^*)$$

The above equation is the only operation needed for D-STBC encoder, where no matrix operation is involved. One row of the resultant matrix $H_{z,i}$, namely $z_{1,i}, z_{2,i}$ is transmitted by one antenna, and the other row, namely $-z^*_{2,i}, z^*_{1,i}$ is transmitted by the other antenna.

Decoding

The decoding of differentially encoded STBC code can be simplified into one step even simpler than STBC decoding itself, considering that there is no channel estimation is needed. Note that all the calculation here is carried out in the frequency domain, therefore, the relation between the transmitted signal and the channel is multiplication, rather than convolution.

Define:

m: OFDM symbol index in time
i: OFDM channel estimation index=2m
k: OFDM sub-carrier index
$x_{1,i}$: first PSK symbol to form STBC block $H_{x,i}$
$x_{2,i}$: second PSK symbol to form STBC block $H_{x,i}$
$y_j(m)$: received signal at antenna j=1,2

The transmitted STBC coded signal (i.e., before the differential encoder) at time m and m+1 is:

$$\begin{bmatrix} x_{1,i} & x_{2,i} \\ -x^*_{2,i} & x^*_{1,i} \end{bmatrix},$$

where the column number is in space domain, while the row number is in time domain. Note the relationship hold true on a per sub-carrier basis.

With differential coding, the received signal at two receiving antennas for STBC block index can be expressed as follows for each sub-carrier, (sub-carrier index not shown) where again m=2i:

$$\begin{bmatrix} y_1(m) \\ y_1(m+1) \end{bmatrix} = \frac{1}{\sqrt{2}} \begin{bmatrix} x_{1,i} & x_{2,i} \\ -x^*_{2,i} & x^*_1 \end{bmatrix} \begin{bmatrix} y_1(m-2) \\ y_1(m-1) \end{bmatrix}$$

$$\begin{bmatrix} y_2(m) \\ y_2(m+1) \end{bmatrix} = \frac{1}{\sqrt{2}} \begin{bmatrix} x_{1,i} & x_{2,i} \\ -x^*_{2,i} & x^*_{1,i} \end{bmatrix} \begin{bmatrix} y_2(m-2) \\ y_2(m-1) \end{bmatrix}$$

From the above two equations, the maximum likelihood signals of $x_{1,i}$ and $x_{2,i}$ can be obtained as:

$\tilde{x}_{1,i} = y_1(m-2)^* y_1(m) + y_1(m-1) y_1(m+1)^* + y_2(m-2)^* y_2(m) + y_2(m-1) y_2(m+1)^*$ $\tilde{x}_{2,i} = y_1(m-1)^* y_1(m) - y_1(m-2) y_1(m+1)^* + y_2(m-1)^* y_2(m) - y_2(m-2) y_2(m+1)^*$ or in a matrix form:

$$\begin{bmatrix} \tilde{x}_{1,i} \\ \tilde{x}_{2,i} \end{bmatrix} = \begin{bmatrix} y_1(m-2)^* & y_1(m-1) \\ y_1(m-1)^* & -y_1(m-2) \end{bmatrix} \begin{bmatrix} y_1(m) \\ y_1(m+1)^* \end{bmatrix} + \begin{bmatrix} y_2(m-2)^* & y_2(m-1) \\ y_2(m-1)^* & -y_2(m-2) \end{bmatrix} \begin{bmatrix} y_2(m) \\ y_2(m+1)^* \end{bmatrix}$$

It is the above matrix equation is depicted in block diagram form in the receiver path of FIG. 8.

Channel Estimation

Since the finally transmitted data are D-STBC encoded, channel parameters for each path can only be estimated through re-encoding the decoded data, after TPS have been successfully decoded. This decision-feedback approach is the key in how to make use of TPS as scattered pilots.

Suppose that after D-STBC re-encoding, we obtain $z_{1,i}$ and $z_{2,i}$, which correspond to $x_{1,i}$ and $x_{2,i}$, respectively, then from receiver antenna 1 we have $$\begin{bmatrix} y_1(m) \\ y_1(m+1) \end{bmatrix} = \begin{bmatrix} z_{1,i} & z_{2,i} \\ -z^*_{2,i} & z^*_{1,i} \end{bmatrix} \begin{bmatrix} h_{11}(m) \\ h_{21}(m) \end{bmatrix}.$$

By solving the above equation, we get $$\begin{bmatrix} h_{11}(m) \\ h_{21}(m) \end{bmatrix} = \frac{1}{\delta^2} \begin{bmatrix} z^*_{1,i} & -z_{2,i} \\ z^*_{2,i} & z_{1,i} \end{bmatrix} \begin{bmatrix} y_1(m) \\ y_1(m+1) \end{bmatrix},$$

where $\delta^2 = |z_{1,i}|^2 + |z_{2,i}|^2.$

In a similar way, we can estimate $h_{12}(m, k)$ and $h_{22}(m, k)$ from the signals received at receiver antenna 2:

$$\begin{bmatrix} h_{12}(m) \\ h_{22}(m) \end{bmatrix} = \frac{1}{\delta^2} \begin{bmatrix} z^*_{1,i} & -z_{1,i} \\ z^*_{2,i} & z_{2,i} \end{bmatrix} \begin{bmatrix} y_2(m) \\ y_2(m+1) \end{bmatrix}.$$

It needs to be noticed that for each STBC block, we can only obtain one set of channel information for the current time, with the assumption that the channel will approximately be the same during this period. As pointed out earlier, this condition can be easily satisfied. Again, all of this is done for each sub-carrier used to transmit STBC blocks of pilot/TPS data.

What has been described is merely illustrative of the application of the principles of the invention. Other arrangements and methods can be implemented by those skilled in the art without departing from the spirit and scope of the present invention.

We claim:

1. A channel quality measurement apparatus adapted to measure a quality of a channel over which has been transmitted a sequence of symbols produced by encoding and constellation mapping a source data element sequence, the apparatus comprising:

a symbol de-mapper, receiving as input a sequence of received symbols over the channel whose quality is to be measured, the symbol de-mapper being adapted to perform symbol de-mapping on the sequence of received symbols to produce a sequence of soft data element decisions, a type of the symbol de-mapping being based on a first channel quality indicator previously transmitted by the apparatus to a transmitter of the sequence of symbols;

a soft decoder, receiving as input the sequence of soft data element decisions produced by the symbol de-mapper, the soft decoder being adapted to decode the sequence of soft data element decisions to produce a decoded output sequence;

an encoder, receiving as input the decoded output sequence produced by the soft decoder, the encoder being adapted to re-encode the decoded output sequence with an identical code to a code used in encoding the source data element sequence to produce a re-encoded output sequence; and a correlator, receiving as input the sequence of soft data element decisions produced by said de-mapper, and the re-encoded output sequence produced by the encoder, said correlator being adapted to produce a second channel quality indicator by determining a correlation between the sequence of soft data element decisions and the re-encoded output sequence, wherein the apparatus is adapted to feed the second channel quality indicator back to the transmitter to apply a type of mapping of the source data element sequence based on the second channel quality indicator so that the type of mapping applied at the transmitter is based on the correlation between the sequence of soft data element decisions and the re-encoded output sequence.

2. The channel quality measurement apparatus of claim 1 wherein the symbol de-mapper is adapted to perform QPSK symbol de-mapping in response to the first channel quality indicator and is adapted to perform Euclidean distance conditional LLR symbol de-mapping in response to the second channel quality indicator.

3. The channel quality measurement apparatus of claim 1 wherein the symbol de-mapper is adapted to perform Euclidean distance conditional LLR symbol de-mapping in response to the first channel quality indicator and is adapted to perform QPSK symbol de-mapping in response to the second channel quality indicator.

4. The channel quality measurement apparatus of claim 1, wherein a type of decoding is based on the first channel quality indicator previously transmitted by the apparatus to the transmitter of the sequence of symbols.

5. The channel quality measurement apparatus of claim 4, wherein the second channel quality indicator is transmitted to the transmitter to adaptively select a type of coding of the source data element sequence.

6. A method of measuring channel quality of a channel over which has been transmitted a sequence of symbols produced by encoding and constellation mapping a source data element sequence, the method comprising:
    receiving a sequence of received symbols over the channel whose quality is to be measured;
    symbol de-mapping said sequence of received symbols to produce a sequence of soft data element decisions;
    decoding said sequence of soft data element decisions to produce a decoded output sequence, the decoding being based on a first channel quality indicator previously transmitted to a transmitter of the sequence of symbols;
    re-encoding said decoded output sequence to produce a re-encoded output sequence using a code identical to a code used in encoding the source data element sequence; and
    correlating said re-encoded output sequence, and said sequence of soft data element decisions to produce a second channel quality indicator; and
    transmitting the second channel quality indicator to the transmitter to adaptively select a type of coding to be applied to a source data element sequence based on the second channel quality indicator so that the type of mapping applied at the transmitter is based on the correlation between the sequence of soft data element decisions and the re-encoded output sequence.

7. The method of channel quality measurement of claim 6 wherein the symbol de-mapping of a sequence of received symbols is QPSK symbol de-mapping in response to the first channel quality indicator and wherein the symbol de-mapping of a sequence of received symbols is Euclidean distance conditional LLR de-mapping in response to the second channel quality indicator.

8. The method of channel quality measurement of claim 6 wherein the symbol de-mapping of a sequence of received symbols comprises Euclidean distance conditional LLR de-mapping in response to the first channel quality indicator, and wherein the symbol de-mapping of a sequence is QPSK symbol de-mapping in response to the second channel quality indicator.

9. An article of manufacture comprising a non-transitory computer-readable storage medium, the non-transitory computer-readable storage medium including instructions for implementing the method of claim 6.

10. A method of measuring OFDM channel quality of an OFDM channel over which has been transmitted a sequence of OFDM symbols, the OFDM symbols containing an encoded and constellation mapped source data element sequence, the method comprising:
    receiving a sequence of OFDM symbols over the OFDM channel whose quality is to be measured;
    symbol de-mapping said sequence of received symbols to produce a sequence of soft data element decisions, the symbol de-mapping being based on a first channel quality indicator previously transmitted to a transmitter of the sequence of OFDM symbols;
    decoding said sequence of soft data element decisions to produce a decoded output sequence pertaining to the source data element sequence, the decoding being based on the first channel quality indicator previously transmitted to the transmitter of the sequence of OFDM symbols;
    re-encoding said decoded output sequence to produce a re-encoded output sequence using a code identical to a code used in encoding the source data element sequence; and
    correlating said re-encoded output sequence, and said sequence of soft data element decisions to produce a second channel quality indicator; and
    transmitting the second channel quality indicator to the transmitter to adaptively select a type of mapping and a type of coding to be applied to a source data element sequence based on the second channel quality indicator so that the type of mapping applied at the transmitter is based on the correlation between the sequence of soft data element decisions and the re-encoded output sequence.

11. The method of OFDM channel quality measurement of claim 10 wherein the symbol de-mapping of said sequence of received symbols is QPSK symbol de-mapping in response to the first channel quality indicator and wherein the symbol de-mapping of a sequence of received symbols is Euclidean distance conditional LLR de-mapping in response to the second channel quality indicator.

12. The method of OFDM channel quality measurement of claim 10 wherein the symbol de-mapping of said sequence of received symbols comprises Euclidean distance conditional LLR de-mapping in response to the first channel quality indicator, and wherein the symbol de-mapping of a sequence is QPSK symbol de-mapping in response to the second channel quality indicator.

13. The method of OFDM channel quality measurement of claim 10 wherein the decoding of said sequence of soft data element decisions to produce a decoded output sequence further comprises using a history of the soft data element decisions, and using information about encoding of the sequence of symbols transmitted over the channel.

14. An article of manufacture comprising a non-transitory computer-readable storage medium, the non-transitory computer-readable storage medium including instructions for implementing the method of claim 9.

15. A communication system comprising:

a transmitter adapted to transmit a sequence of symbols produced by encoding and constellation mapping a source data element sequence over a channel; and a receiver comprising:

a) a symbol de-mapper, receiving as input a sequence of received symbols over the channel, said symbol de-mapper being adapted to perform symbol de-mapping on said sequence of received symbols to produce a sequence of soft data element decisions, a type of the symbol de-mapping being based on a first channel quality indicator previously transmitted by the receiver to the transmitter of the sequence of symbols;

b) a soft decoder, receiving as input the sequence of soft data element decisions produced by the symbol de-mapper, said soft decoder being adapted to decode the sequence of soft data element decisions to produce a decoded output sequence;

c) an encoder, receiving as input the decoded output sequence produced by the soft decoder, said encoder being adapted to re-encode the decoded output sequence with an identical code to a code used in encoding the source data element sequence to produce a re-encoded output sequence; and d) a correlator, receiving as input the sequence of soft data element decisions produced by the de-mapper, and the re-encoded output sequence produced by the encoder, said correlator being adapted to produce a second channel quality indicator by determining a correlation between the sequence of soft data element decisions and the re-encoded output sequence, wherein the receiver is adapted to feed the second channel quality indicator back to the transmitter, and wherein the transmitter is adapted to apply a type of modulation of the source data element sequence based on the second channel quality indicator so that the type of modulation applied at the transmitter is based on the correlation between the sequence of soft data element decisions and the re-encoded output sequence.

16. The communication system of claim 15 wherein the symbol de-mapper is adapted to perform QPSK symbol de-mapping in response to the first channel quality indicator and is adapted to perform Euclidean distance conditional LLR symbol de-mapping in response to the second channel quality indicator.

17. The communication system of claim 15 wherein the first and second channel quality indicators correspond to a first and second bit error rate, respectively.

18. The communication system of claim 15, wherein a type of the decoding is based on the first channel quality indicator previously transmitted by the receiver to the transmitter of the sequence of symbols.

* * * * *